US010814324B2

(12) United States Patent
Hadwen et al.

(10) Patent No.: US 10,814,324 B2
(45) Date of Patent: Oct. 27, 2020

(54) AM-EWOD ARRAY ELEMENT CIRCUITRY WITH SHARED SENSOR COMPONENTS

(71) Applicant: Sharp Life Science (EU) Limited, Oxford (GB)

(72) Inventors: Benjamin James Hadwen, Oxford (GB); Oliver James Beard, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 234 days.

(21) Appl. No.: 15/990,916

(22) Filed: May 29, 2018

(65) Prior Publication Data

US 2019/0366344 A1 Dec. 5, 2019

(51) Int. Cl.
*B01L 3/00* (2006.01)

(52) U.S. Cl.
CPC ..... *B01L 3/502792* (2013.01); *B01L 3/50273* (2013.01); *B01L 2300/0645* (2013.01); *B01L 2400/0427* (2013.01)

(58) Field of Classification Search
CPC ........... B01L 3/502792; B01L 3/50273; B01L 2400/0427; B01L 2300/0645; B01L 2300/0819; B01L 2200/143; G01N 27/02
See application file for complete search history.

(56) References Cited

U.S. PATENT DOCUMENTS

| | | | |
|---|---|---|---|
| 7,087,883 | B2 | 8/2006 | He et al. |
| 7,163,612 | B2 | 1/2007 | Sterling et al. |
| 8,173,000 | B1 | 5/2012 | Hadwen et al. |
| 8,653,832 | B2 | 2/2014 | Hadwen et al. |

(Continued)

FOREIGN PATENT DOCUMENTS

| | | |
|---|---|---|
| EP | 1562371 | 10/2005 |
| EP | 2385359 | 9/2011 |
| EP | 2614892 | 7/2013 |

OTHER PUBLICATIONS

Fair, R.B., "Digital microfluids: is a true lab-on-a-chip possible?" Microfluidics and Nanofluidics Jun. 2007, vol. 3, Issue 3, pp. 245-281.

(Continued)

*Primary Examiner* — J. Christopher Ball

(74) *Attorney, Agent, or Firm* — Renner, Otto, Boisselle & Sklar, LLP

(57) ABSTRACT

An AM-EWOD device includes a plurality of array elements arranged in an array of rows and columns, each of the array elements including array element circuitry, an element electrode, and a reference electrode. The array element circuitry includes actuation circuitry that applies actuation voltages to the element and reference electrodes, and impedance sensor circuitry that senses impedance at the array element electrode to determine a droplet property at the array element. At least one component of the impedance sensor circuitry is a shared component that is shared between more than one of the array elements. The shared component may include a shared sensor readout transistor that passes a sensor current to a sensor output line, or a shared reset transistor that applies a reset voltage to a gate of the shared sensor readout transistor, with such components being shared by array elements in adjacent rows. The shared component may include a shared sensor output column line that is shared between array elements in adjacent columns.

22 Claims, 18 Drawing Sheets

(56) References Cited

U.S. PATENT DOCUMENTS

| | | | |
|---|---|---|---|
| 2012/0006684 | A1 | 1/2012 | Hawden et al. |
| 2017/0056887 | A1 | 3/2017 | Hadwen et al. |
| 2017/0076676 | A1 | 3/2017 | Hadwen |
| 2018/0078934 | A1 | 3/2018 | Hadwen et al. |

OTHER PUBLICATIONS

Rival et al., "An EWOD-based microfluidic chip for single-cell isolation, mRNA purification and subsequent multiplex qPCR.", Lab on a Chip, vol. 19, pp. 3739-3749, Oct. 7, 2014 (Abstract Only).

AM-EWOD ARRAY ELEMENT CIRCUITRY WITH SHARED SENSOR COMPONENTS

TECHNICAL FIELD

The present invention relates to droplet microfluidic devices, and more specifically to Active Matrix Electrowetting-On-Dielectric (AM-EWOD) devices and array element circuitry for actuation and sensing with respect to each array element.

BACKGROUND ART

Electrowetting on dielectric (EWOD) is a well-known technique for manipulating droplets of fluid by application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 is a drawing depicting an exemplary EWOD based microfluidic system. In the example of FIG. 1, the microfluidic system includes a reader 32 and a cartridge 34. The cartridge 34 may contain a microfluidic device, such as an AM-EWOD device 36, as well as (not shown) fluid input ports into the device and an electrical connection as are conventional. The fluid input ports may perform the function of inputting fluid into the AM-EWOD device 36 and generating droplets within the device, for example by dispensing from input reservoirs as controlled by electrowetting. As further detailed below, the microfluidic device includes an electrode array configured to receive the inputted fluid droplets.

The microfluidic system further may include a control system configured to control actuation voltages applied to the electrode array of the microfluidic device to perform manipulation operations to the fluid droplets. For example, the reader 32 may contain such a control system configured as control electronics 38 and a storage device 40 that may store any application software and any data associated with the system. The control electronics 38 may include suitable circuitry and/or processing devices that are configured to carry out various control operations relating to control of the AM-EWOD device 36, such as a CPU, microcontroller or microprocessor.

In the example of FIG. 1, an external sensor module 35 is provided for sensor droplet properties. For example, optical sensors as are known in the art may be employed as external sensors for sensor droplet properties. Suitable optical sensors include camera devices, light sensors, charged coupled devices (CCD) and similar image sensors, and the like. As further detailed below, a sensor alternatively may be configured as internal sensor circuitry incorporated as part of the drive circuitry in each array element. Such sensor circuitry may sense droplet properties by the detection of an electrical property at the array element, such as impedance or capacitance.

FIG. 2 is a drawing depicting additional details of the exemplary AM-EWOD device 36 in schematic perspective. The AM-EWOD device 36 has a lower substrate 44 with thin film electronics 46 disposed upon the lower substrate 44. The thin film electronics 46 are arranged to drive array element electrodes 48. A plurality of array element electrodes 48 are arranged in an electrode or element two-dimensional array 50, having N rows by M columns of array elements where N and M may be any integer. A liquid droplet 52 which may include any polar liquid and which typically may be aqueous, is enclosed between the lower substrate 44 and a top substrate 54 separated by a spacer 56, although it will be appreciated that multiple liquid droplets 52 can be present.

FIG. 3 is a drawing depicting a cross section through some of the array elements of the exemplary AM-EWOD 36 device of FIG. 2. In the portion of the AM-EWOD device depicted in FIG. 3, the device includes a pair of the array element electrodes 48A and 48B that are shown in cross section that may be utilized in the electrode or element array 50 of the AM-EWOD device 36 of FIG. 3. The AM-EWOD device 36 further incorporates the thin-film electronics 46 disposed on the lower substrate 44, which is separated from the upper substrate 54 by the spacer 56. The uppermost layer of the lower substrate 44 (which may be considered a part of the thin film electronics layer 46) is patterned so that a plurality of the array element electrodes 48 (e.g. specific examples of array element electrodes are 48A and 48B in FIG. 3) are realized. The term element electrode 48 may be taken in what follows to refer both to the physical electrode structure 48 associated with a particular array element, and also to the node of an electrical circuit directly connected to this physical structure. A reference electrode 58 is shown in FIG. 3 disposed upon the top substrate 54, but the reference electrode alternatively may be disposed upon the lower substrate 44 to realize an in-plane reference electrode geometry. The term reference electrode 58 may also be taken in what follows to refer to both or either of the physical electrode structure and also to the node of an electrical circuit directly connected to this physical structure.

In the AM-EWOD device 36, a non-polar fluid 60 (e.g. oil) may be used to occupy the volume not occupied by the liquid droplet 52. An insulator layer 62 may be disposed upon the lower substrate 44 that separates the conductive element electrodes 48A and 48B from a first hydrophobic coating 64 upon which the liquid droplet 52 sits with a contact angle 66 represented by θ. The hydrophobic coating is formed from a hydrophobic material (commonly, but not necessarily, a fluoropolymer). On the top substrate 54 is a second hydrophobic coating 68 with which the liquid droplet 52 may come into contact. The reference electrode 58 is interposed between the top substrate 54 and the second hydrophobic coating 68.

The contact angle θ for the liquid droplet is defined as shown in FIG. 3, and is determined by the balancing of the surface tension components between the solid-liquid ($\gamma_{SL}$), liquid-gas ($\gamma_{LG}$) and non-ionic fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \quad \text{(equation 1)}$$

In operation, voltages termed the EW drive voltages, (e.g. $V_T$, $V_0$ and $V_{00}$ in FIG. 3) may be externally applied to different electrodes (e.g. reference electrode 58, element electrodes 48A and 48A, respectively). The resulting electrical forces that are set up effectively control the hydrophobicity of the hydrophobic coating 64. By arranging for different EW drive voltages (e.g. $V_0$ and $V_{00}$) to be applied to different element electrodes (e.g. 48A and 48B), the liquid droplet 52 may be moved in the lateral plane between the two substrates.

FIG. 4A shows a circuit representation of the electrical load 70A between the element electrode 48 and the reference electrode 58 in the case when a liquid droplet 52 is present. The liquid droplet 52 can usually be modeled as a resistor and capacitor in parallel. Typically, the resistance of the droplet will be relatively low (e.g. if the droplet contains ions) and the capacitance of the droplet will be relatively high (e.g. because the relative permittivity of polar liquids is relatively high, e.g. ~80 if the liquid droplet is aqueous). In many situations the droplet resistance is relatively small, such that at the frequencies of interest for electrowetting, the liquid droplet 52 may function effectively as an electrical short circuit. The hydrophobic coatings 64 and 68 have electrical characteristics that may be modelled as capacitors, and the insulator 62 may also be modelled as a capacitor. The overall impedance between the element electrode 48 and the reference electrode 58 may be approximated by a capacitor whose value is typically dominated by the contribution of the insulator 62 and hydrophobic coatings 64 and 68 contributions, and which for typical layer thicknesses and materials may be on the order of a pico-Farad in value.

FIG. 4B shows a circuit representation of the electrical load 70B between the element electrode 48 and the reference electrode 58 in the case when no liquid droplet is present. In this case the liquid droplet components are replaced by a capacitor representing the capacitance of the non-polar fluid 60 which occupies the space between the top and lower substrates. In this case the overall impedance between the element electrode 48 and the reference electrode 58 may be approximated by a capacitor whose value is dominated by the capacitance of the non-polar fluid and which is typically small, on the order of femto-Farads.

For the purposes of driving and sensing the array elements, the electrical load 70A/70B overall functions in effect as a capacitor, whose value depends on whether a liquid droplet 52 is present or not at a given element electrode 48. In the case where a droplet is present, the capacitance is relatively high (typically of order pico-Farads), whereas if there is no liquid droplet present the capacitance is low (typically of order femto-Farads). If a droplet partially covers a given electrode 48 then the capacitance may approximately represent the extent of coverage of the element electrode 48 by the liquid droplet 52.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in active matrix display technologies. The approach of U.S. Pat. No. 7,163,612 may be termed "Active Matrix Electrowetting on Dielectric" (AM-EWOD). There are several advantages in using TFT based thin film electronics to control an EWOD array, namely:

- Electronic driver circuits can be integrated onto the lower substrate.
- TFT-based thin film electronics are well suited to the AM-EWOD application. They are cheap to produce so that relatively large substrate areas can be produced at relatively low cost.
- TFTs fabricated in standard processes can be designed to operate at much higher voltages than transistors fabricated in standard CMOS processes. This is significant since many EWOD technologies require electrowetting voltages in excess of 20V to be applied.

FIG. 5 is a drawing depicting an exemplary arrangement of thin film electronics 46 in the exemplary AM-EWOD device 36 of FIG. 2. The thin film electronics 46 is located upon the lower substrate 44. Each array element 51 of the array of elements 50 contains an array element circuit 72 for controlling the electrode potential of a corresponding element electrode 48. Integrated row driver 74 and column driver 76 circuits are also implemented in thin film electronics 46 to supply control signals to the array element circuit 72. The array element circuit 72 may also contain a sensor capability for detecting the presence or absence of a liquid droplet in the location of the array element. Integrated sensor row addressing 78 and column detection circuits 80 may further be implemented in thin film electronics for the addressing and readout of the sensor circuitry in each array element.

A serial interface 82 may also be provided to process a serial input data stream and facilitate the programming of the required voltages to the element electrodes 48 in the array 50. A voltage supply interface 84 provides the corresponding supply voltages, top substrate drive voltages, and other requisite voltage inputs as further described herein. A number of connecting wires 86 between the lower substrate 44 and external control electronics, power supplies and any other components can be made relatively few, even for large array sizes. Optionally, the serial data input may be partially parallelized. For example, if two data input lines are used the first may supply data for columns 1 to X/2, and the second for columns (1+X/2) to M with minor modifications to the column driver circuits 76. In this way the rate at which data can be programmed to the array is increased, which is a standard technique used in liquid crystal display driving circuitry.

Various methods of controlling an AM-EWOD device to sense droplets and perform desired droplet manipulations have been described. For example, US 2017/0056887 (Hadwen et al., published Mar. 2, 2017) describes the use of capacitance detection to sense dynamic properties of reagents as a way for determining the output of an assay.

FIG. 6 is a drawing depicting an array element including exemplary array element circuitry for an AM-EWOD device that embodies a previous design of Applicant. This basic circuit for has three thin film transistors (TFTs T1, T2, and T3) and two capacitors (C1 and C2), and is associated with seven addressing lines. The pixel circuits, here and throughout, are drawn with the following conventions. The boundaries of the pixel are denoted by a dotted line. Row and column addressing lines are shown passing through the pixel in the horizontal and vertical directions respectively. Power supply connections, which could in principle be supplied either in row or column lines, are shown by short horizontal lines (e.g. VCCA in FIG. 6). Connecting wires are shown with a solder dot, and without the dot, crossing lines do not connect.

The node marked electrode is connected to the array element electrode The components Cl, $R_{drop}$ and $C_{drop}$ represent the approximate load presented between the device electrode and the top electrode TP in an operational situation. Since these components are not explicitly part of the thin film circuit, they are not included in the stated design component counts. Cl represents the capacitance of the hydrophobic coatings in contact with the upper and lower surface of the droplet and any other insulator layers incorporated into the device. The values of $R_{drop}$ and $C_{drop}$ will vary based on the presence or absence of a droplet, as described above with respect to FIGS. 4A and 4B. Example AM-EWOD devices having this basic circuit design are described in Applicant's commonly assigned U.S. Pat. No. 8,653,832 (Hadwen et al., issued Feb. 18, 2014) and US 2018/0078934 (Hadwen et al., published Mar. 22, 2018).

The circuit of FIG. 6 generally is operated generally as follows. To program an array element by writing voltage data to said array element, the voltage to be programmed is loaded onto addressing line SL, and a pulse is applied to the gate line GL appropriate for the row being programmed. This turns on a switch transistor T1, and the circuit node connected to the electrode is charged to the programmed voltage. When GL is taken low, this voltage is preserved, stored on a storage capacitor C1. Typically, C1 is larger than the second or sensor capacitor C2 by at least about an order of magnitude. To perform sensing, in a reset step a reset transistor T2 is turned on by an RST signal, so the gate of a sensor readout transistor T3 charges to VCCA. VCCA is a reset potential chosen below the threshold voltage of T3 such that T3 remains off and any previous voltage is cleared. In a sensing step, an addressing line RWS is pulsed. For the duration of the RWS pulse, the electrode potential is perturbed to a higher voltage. The change in voltage achieved is principally a function of the ratio of capacitor C1 to the total capacitance at the electrode, which includes the load associated with whether the droplet is present or absent. The sensor capacitor performs the function of AC coupling a perturbation in the potential of the electrode through to the gate of T3. The perturbed potential at the gate of T3 is thus a function only of the change (perturbation) in voltage at the electrode and not the DC level of the electrode voltage. The perturbation is coupled through the sensor capacitor C2 to the gate of T3, and transistor T3 is accordingly turned on to an extent determined by the amplitude of the pulse as coupled. The resultant current passes through T3 and sunk down a sensor output column line COL, which may then be sensed by column detection circuitry at the bottom of the column of the array (not shown).

FIG. 7 is a drawing depicting a plurality of array elements of FIG. 6 configured as a 2×2 element array. It will be appreciated that any suitable number of array elements may be incorporated into a desired size of a two-dimensional array of rows and columns. When configured as an array in this manner, each array element incorporates its own three transistor/two capacitor circuitry, i.e., the various circuit elements are repeated in the circuitry of every array element.

The basic array element circuitry of FIGS. 6 and 7 can be modified as may be advantageous for certain applications or circumstances. FIG. 8 is a drawing depicting an array element including exemplary array element circuitry for an AM-EWOD device that embodies another previous design of Applicant. Comparable configurations are described in Applicant's commonly assigned US 2017/0076676 (Hadwen, published Mar. 16, 2017). In this implementation, the three transistor/two capacitor sensing circuitry of U.S. Pat. No. 8,653,832 can be combined with a two transistor/one capacitor array element actuation circuit. This implementation thus contains a total of five transistors, three capacitors, and nine addressing lines, with additional actuation circuitry being combined with impedance sensor circuitry as described. Addressing lines control access to an additional dynamic RAM memory circuit comprising the transistor T4 and a capacitor C3. The voltage programmed to this capacitor in turn controls whether or not the input signal from the actuation circuit is connected through to the array element electrode depending upon whether the voltage written to C3 is sufficient to turn on T5. The input signal SEL may further be used to isolate the element electrode from the actuation signal when the sensing function is being operated. In other respects the sensing function may proceed comparably as described with respect to FIG. 6. In addition, when the embodiment of FIG. 8 is configured as an array of a plurality of such elements, similarly as shown in FIG. 7, each array element incorporates its own three transistor/two impedance sensor circuitry, i.e., the various circuit elements are repeated in every array element.

FIG. 9 is a drawing depicting an array element including exemplary array element circuitry for an AM-EWOD device that embodies another previous design of Applicant. Comparable configurations are described on Applicant's commonly assigned U.S. Pat. No. 8,173,000 (Hadwen et al., issued May 8, 2012). In this implementation, the three transistor/two capacitor impedance sensor circuitry of U.S. Pat. No. 8,653,832 can be combined with an actuation circuit and memory function incorporating an SRAM cell. The memory function includes an n-type switch transistor T4, a p-type switch transistor T5, a first inverter I1, and a second inverter I2. This implementation further includes an inversion circuit including two analogue switches 51 and S2. The capacitances Ch and Cl refer to capacitances of the device layers including the hydrophobic coatings and insulator layers. As described in U.S. Pat. No. 8,173,000, the memory function is written by applying a voltage pulse so as to turn on one of the switch transistors T4 or T5. The input voltage thus written is supplied to the at the inversion circuit. The operation of the inversion circuit provides an inverted memory node signal that can be obtained from connection to the node between the two inverters of the SRAM cell. In other respects, the sensing function may proceed comparably as described with respect to FIG. 6. In addition, when the embodiment of FIG. 9 is configured as an array of a plurality of such elements, similarly as shown in FIG. 7, each array element incorporates its own three transistor/two capacitor impedance sensor circuitry, i.e., the various circuit elements are repeated in every array element.

For many applications there is a motivation to make the array element size as small as practicable (e.g. 100 um or less). For example, the minimum volume of fluid that can be manipulated can be reduced by reducing the size of the array elements. For certain applications, such as for example cell-based assays or digital assays, it is desirable to reduce droplet sizes, which can be achieved by reducing the overall size of the array elements. Reduced droplet size can improve the assay chemistry, in that smaller droplets move and mix faster making more efficient use of expensive reagents. This relatedly can prevent diluting a species of interest, e.g. a single cell, a bead with a species immobilized upon an unnecessarily large volume of surrounding fluid, or the like. If the surrounding droplet is too large, this may make detection more difficult; for example if a cell is lysed to analyze its constituents, and these become diluted in the surrounding fluid. Reduced droplet size also can permit operating with a higher number of droplets per area of chip, increasing the number of parallel operations that can be conducted on a device of the same size, or else permitting an overall reduced device size.

For an AM-EWOD device using TFT electronics as the backplane, the minimum array element size is commonly constrained by the physical size of the array element circuitry, which corresponds to the layout area occupied by the transistors, capacitors, and addressing lines of the array element circuitry referenced above. For a conventional 3 um TFT deposition process, as may for example be used for LTPS displays for smartphone applications and for AM-EWOD devices, the pixel size is constrained to 100-200 um depending on the choice of pixel circuit used. The array element size of an AM-EWOD device is the physical size of the electrodes plus the gap between adjacent electrodes. Passive digital microfluidic devices with array element sizes as small as 21 μm have been reported with minimum droplet volume of 5 pL (A. Rival, D. J. C. Delattre, Y. Fouillet, G. Castellan, A. B.-C. Gidrol and X., "An EWOD-based microfluidic chip for single-cell isolation, mRNA purification and subsequent multiplex qPCR," *Lab on a Chip*, vol. 19, pp. 3739-3749, 2014).

There further may be motivation to simplify the array element circuitry in an AM-EWOD device, even if the array element size is not significantly reduced. Array element circuits with fewer transistors may have improved manufacturing yield and decreased power consumption in the TFT electronics.

The concept of sharing sensor readout circuitry is known in CMOS image sensors. For example, U.S. Pat. No. 7,087,883 (He et al., issued Aug. 8, 2006) describes an arrangement whereby the sensor readout transistor is shared between pixels in adjacent rows. This is accomplished with selection transistors in each of the shared pixels, connected between a node in the individual pixels and the shared readout transistor. Comparable principles have not been applied to AM-EWOD devices, as coupling between the shared nodes and the individual pixels is achieved by means of a capacitor in AM-EWOD devices with integrated sensing, and the CMOS images sensors do not operate in such fashion.

SUMMARY OF INVENTION

The present invention pertains to enhanced configurations of array element circuitry in AM-EWOD devices, which realize a simplified array element circuitry with negligible loss of functionality. The AM-EWOD array element circuitry may be simplified by combining components or addressing line from array elements in adjacent rows or columns. In exemplary embodiments, the electrodes of two or more array elements are AC coupled to the input of the sensor readout transistor. The sensor readout transistor, therefore, is common to array elements from multiple rows. In addition, the reset transistor for addressing the node at the gate of the sensor readout transistor likewise is common to array elements from multiple rows. Accordingly, the reset signal and power supply lines also are common to the multiple rows.

In another exemplary embodiment, a sensor column readout line is common between two array elements in adjacent columns. The two array elements may have different circuit configurations and the control signals are appropriately timed for sharing the sensor readout.

The embodiments described herein have advantages in providing simpler array element circuitry as compared to conventional configurations. The described embodiments, therefore, have a reduced number of components and/or number of addressing lines, which can improve yield and/or permit a smaller physical size of the array elements.

An aspect of the invention, therefore, is an AM-EWOD device having enhanced array element circuitry by providing a shared component of the impedance sensor circuitry of multiple array elements. In exemplary embodiments, an AM-EWOD device includes a plurality of array elements arranged in an array of rows and columns, each of the array elements including array element circuitry, an element electrode, and a reference electrode. The array element circuitry includes actuation circuitry configured to apply actuation voltages to the element and reference electrodes for actuating the array element; and impedance sensor circuitry configured to sense impedance at the array element electrode to determine a droplet property at the array element, wherein at least one component of the impedance sensor circuitry is a shared component that is shared between more than one of the array elements.

In exemplary embodiments, the shared component includes a shared sensor readout transistor that passes a sensor current to a sensor output line, and a shared reset transistor that applies a reset voltage to a gate of the shared sensor readout transistor, with such components being shared by array elements in adjacent rows. In other exemplary embodiments, the shared component includes a shared sensor output column line that is shared between array elements in adjacent columns.

Another aspect of the invention is method of operating an AM-EWOD of any of the embodiments in which the impedance sensor circuitry includes a component that is shared between more than one of the array elements. In exemplary embodiments the method includes applying actuation voltages to the element and reference electrodes of the first and/or the second array elements with the actuation circuitry to actuate the first and/or second array elements; and performing a sensing operation using said impedance sensor circuitry.

The sensing operation may include the steps of resetting a potential at the shared component of the impedance sensor circuitry by applying a reset potential to said shared component; performing a sensing operation on a first array element by pulsing an address line to the impedance sensor circuitry of the first array element, and reading an output current from the shared component to sense an impedance at the array element electrode of the first array element to determine a droplet property at the first array element; and performing a sensing operation on a second array element by pulsing an address line to the impedance sensor circuitry of the second array element, and reading an output current from the shared component to sense an impedance at the array element electrode of the second array element to determine a droplet property at the second array element; wherein the address lines of the first array element and the second array element are pulsed at different times.

In exemplary embodiments, the sensing operation may include the steps of resetting a potential at the impedance sensor circuitry of the first array element and the second array element by applying a reset potential to said impedance sensor circuitry of the first array element and the second array element; performing a sensing operation on the first array element by pulsing a shared address line to the impedance sensor circuitry of the first array element and the second array element, and reading an output current from the shared sensor output column line to sense an impedance at the array element electrode of the first array element to determine a droplet property at the first array element; and performing a sensing operation on the second array element by pulsing the shared address line, and reading an output current from the shared sensor output column line to sense an impedance at the array element electrode of the second array element to determine a droplet property at the second array element; wherein while performing the sensing operation on the first array element, there is no output current from the second array element, and while performing the sensing operation on the second array element, there is no output current from the first array element These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DESCRIPTION OF EMBODIMENTS

Figure 1:
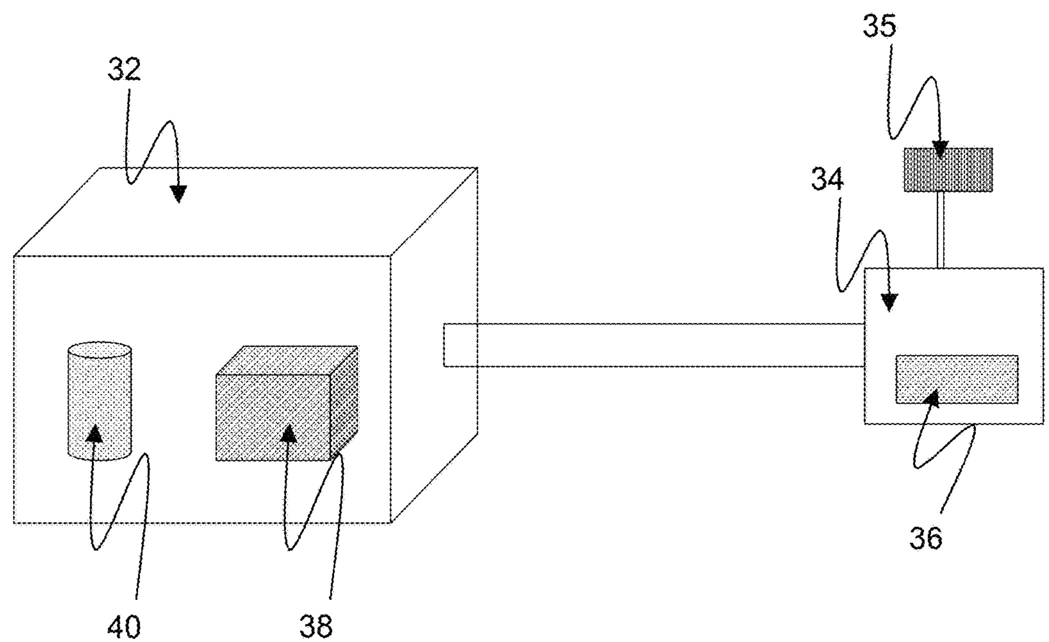
FIG. 1 is a drawing depicting an exemplary EWOD based microfluidic system.
Figure 2:
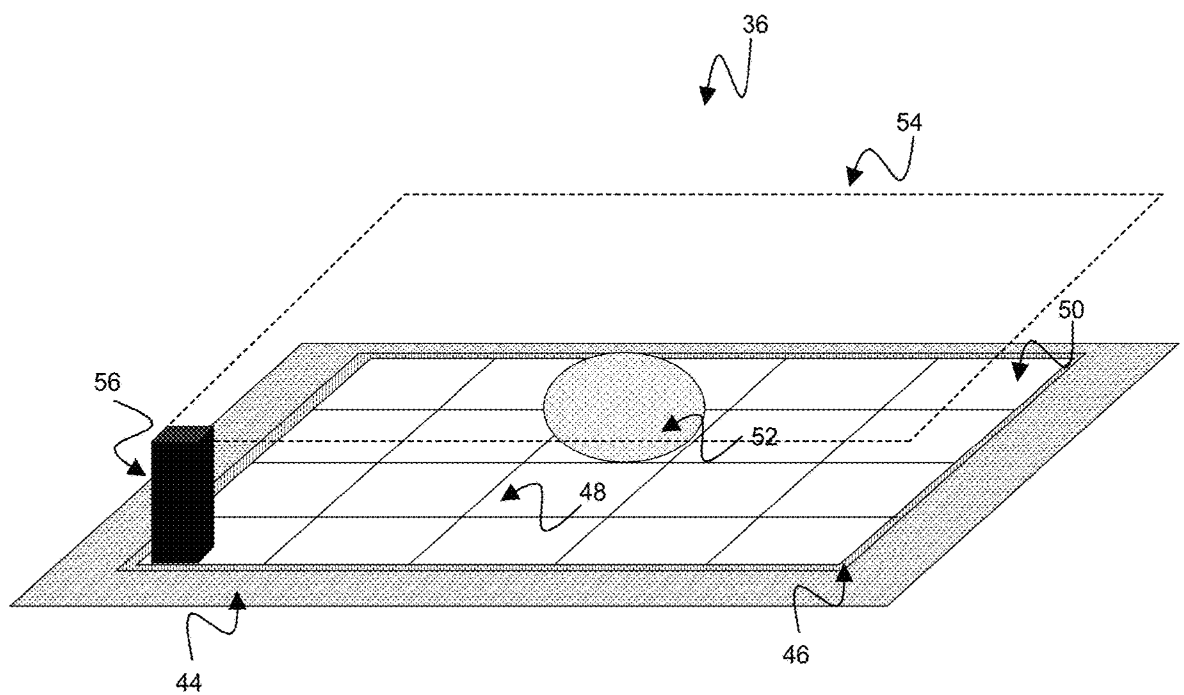
FIG. 2 is a drawing depicting an exemplary AM-EWOD device in schematic perspective.
Figure 3:
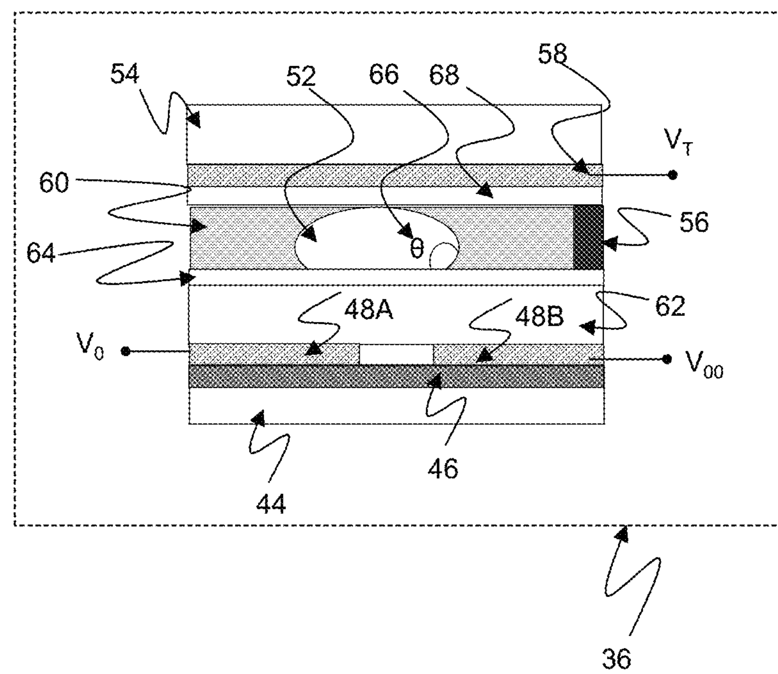
FIG. 3 is a drawing depicting a cross section through some of the array elements of the exemplary AM-EWOD device of FIG. 2.

Embodiments of the present invention will now be described with reference to the drawings, wherein like reference numerals are used to refer to like elements throughout. It will be understood that the figures are not necessarily to scale.

The present invention pertains to enhanced configurations of array element circuitry in AM-EWOD devices, which realize a simplified array element circuit with negligible loss of functionality. The AM-EWOD array element circuit may be simplified by combining components and/or addressing lines associated with the impedance sensor circuitry in adjacent rows or columns.

An aspect of the invention, therefore, is an AM-EWOD device having enhanced array element circuitry by providing a shared component of the impedance sensor circuitry of multiple array elements. In exemplary embodiments, an AM-EWOD device includes a plurality of array elements arranged in an array of rows and columns, each of the array elements including array element circuitry, an element electrode, and a reference electrode. The array element circuitry includes actuation circuitry configured to apply actuation voltages to the element and reference electrodes for actuating the array element; and impedance sensor circuitry configured to sense impedance at the array element electrode to determine a droplet property at the array element, wherein at least one component of the impedance sensor circuitry is a shared component that is shared between more than one of the array elements.

In exemplary embodiments, the electrodes of two or more array elements are AC coupled to the input of the sensor readout transistor. The sensor readout transistor, therefore, is common to array elements from multiple rows. In addition, the reset transistor for addressing the node at the gate of the sensor readout transistor likewise is common to array elements from multiple rows. Accordingly, the reset signal and power supply lines also are common to the multiple rows.

Figure 10:
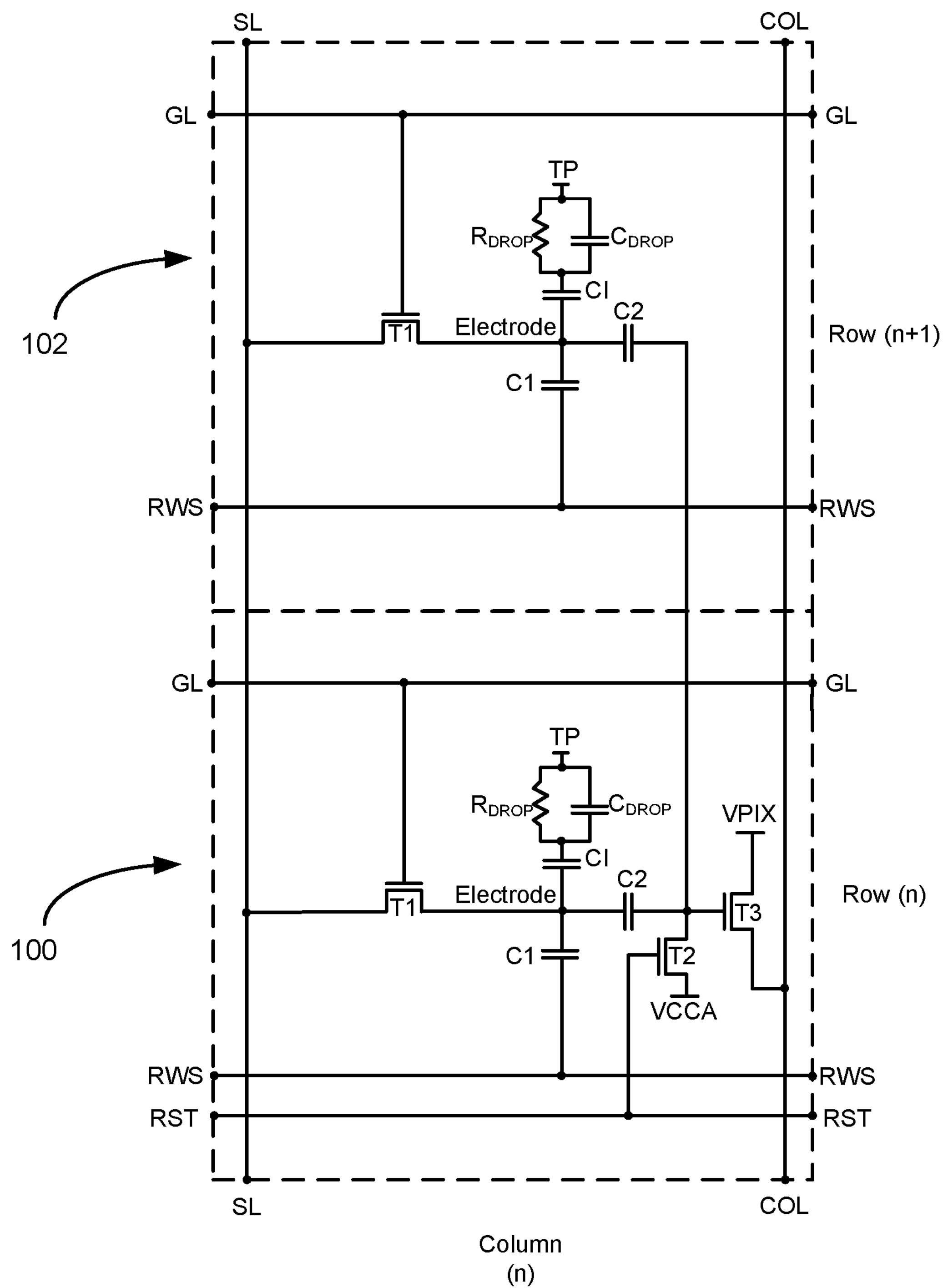
FIG. 10 is a drawing depicting a plurality of array elements including exemplary array element circuitry for an AM-EWOD device, which provides an enhanced circuit configuration that improves over the configuration depicted in FIGS. 6 and 7.
Figure 11:
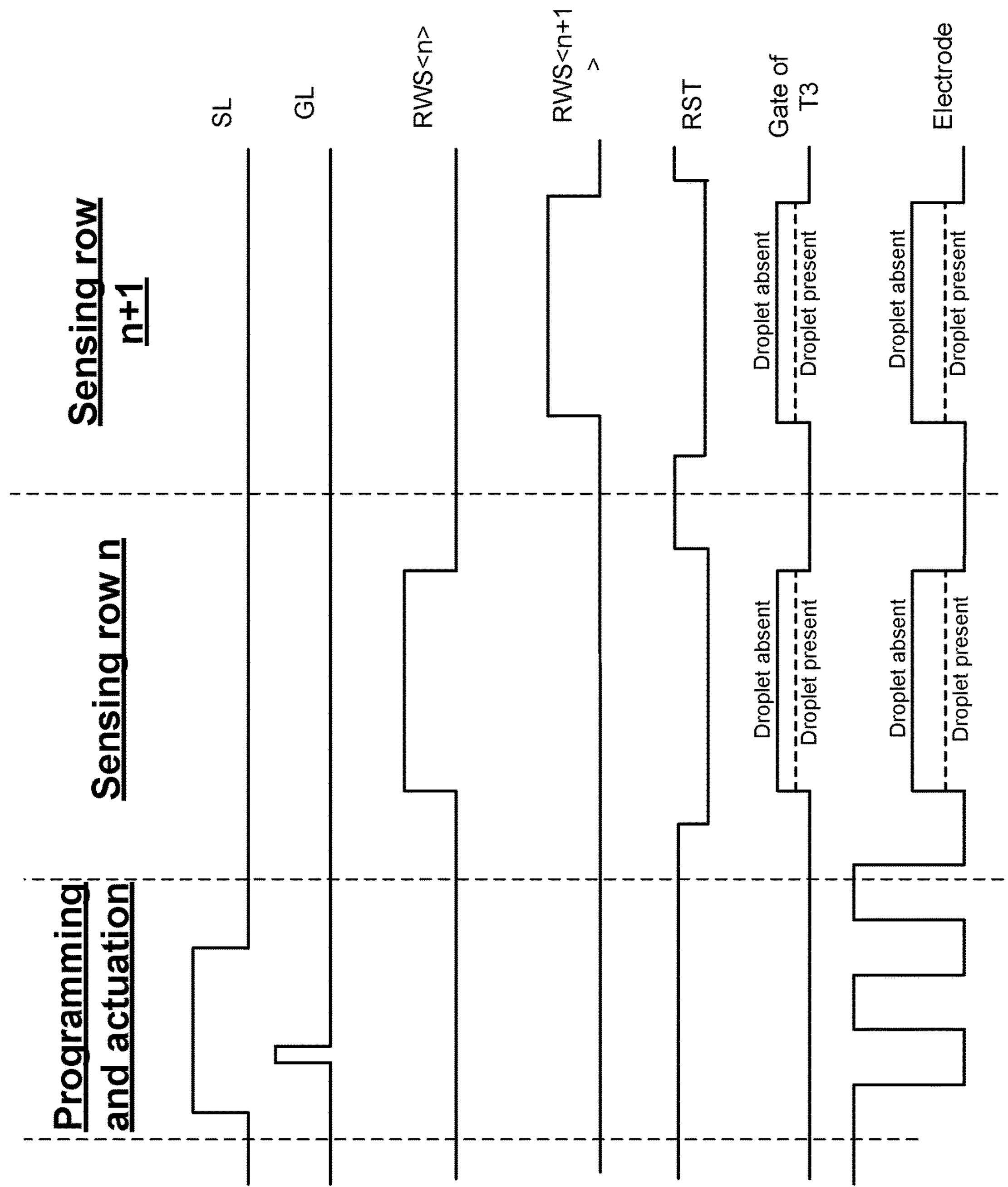
FIG. 11 is a timing diagram that illustrates the operation of the embodiment of FIG. 10.

As an example of such embodiments, FIG. 10 is a drawing depicting a plurality of array elements including exemplary array element circuitry for an AM-EWOD device in accordance with embodiments of the present invention. The embodiment of FIG. 10 provides an enhanced circuit configuration that improves over the configuration depicted in FIGS. 6 and 7. FIG. 11 is a timing diagram that illustrates the operation of the embodiment of FIG. 10. FIG. 10 depicts a pair of array elements including a first array element 100 and a second array element 102 positioned in adjacent rows, respectively Row(n) and Row(n+1). Generally, the embodiment of FIG. 10 is a modification of the circuit configuration of FIGS. 6 and 7, with the reset transistor T2 and the sensor readout transistor T3 operating in a shared manner for both array elements 100 and 102.

Figure 4A:
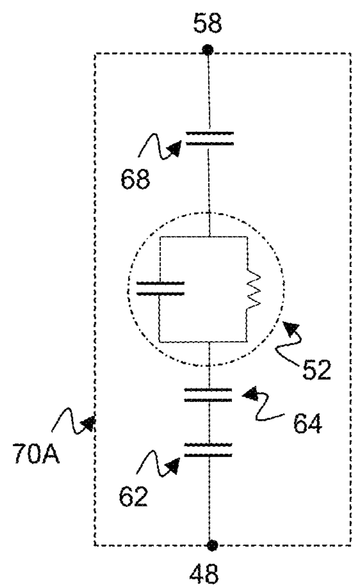
FIG. 4A is a drawing depicting a circuit representation of the electrical load presented at the element electrode when a liquid droplet is present.
Figure 4B:
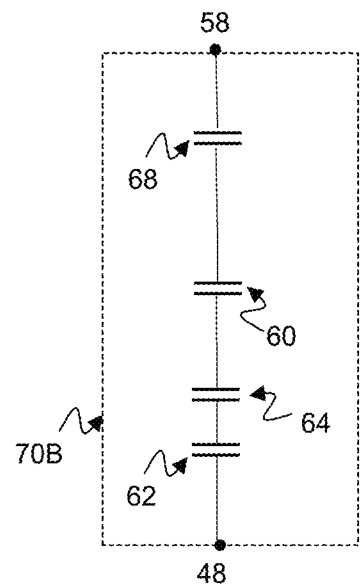
FIG. 4B is a drawing depicting a circuit representation of the electrical load presented at the element electrode when no liquid droplet is present.
Figure 5:
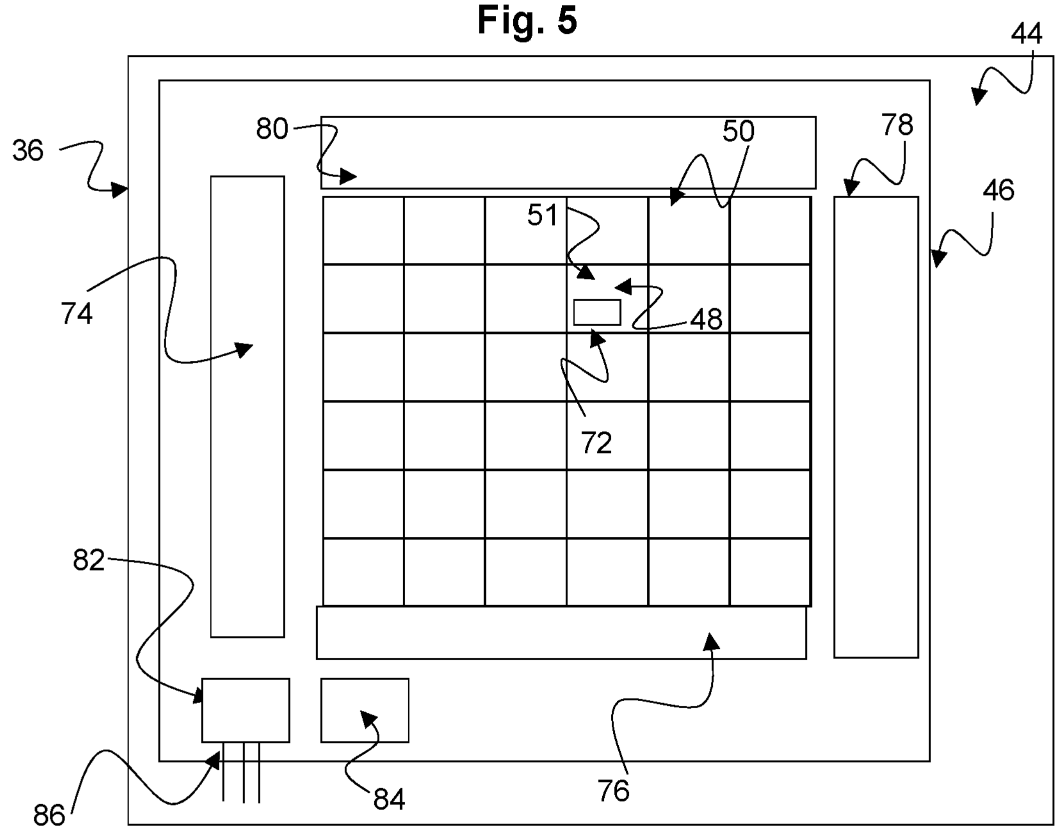
FIG. 5 is a drawing depicting an exemplary arrangement of thin film electronics in the exemplary AM-EWOD device of FIG. 2.

Referring to FIG. 10 in conjunction with the timing diagram of FIG. 11, programming and sensing proceeds as follows. Similarly as described with respect to FIG. 6, this basic circuit for impedance sensing has three thin film transistors (TFTs T1, T2, and T3) and two capacitors including a storage capacitor C1 and a sensor capacitor C2. The $R_{drop}$ and $C_{drop}$ represent the resistance and capacitance across the device from the top electrode TP to the hydrophobic coating on which the droplet may sit. The capacitance of lower device components, including the hydrophobic coating and any other insulator layers incorporated into the device, are represented by the capacitance Cl. The values of $R_{drop}$ and $C_{drop}$ will vary based on the presence or absence of a droplet, as described above with respect to FIGS. 4A and 4B. The storage capacitor C1 is connected to the opposite terminal of the sensor capacitor C2 relative to the terminal to which the sensor readout transistor T3 is connected to the sensor capacitor C2. Comparing FIG. 10 to the previous array design of FIG. 7, the first array element 100 includes the reset transistor T2 and the sensor readout transistor T3 with the associated power supply VP IX, and these elements are absent from the second array element 102. Instead, the node at the drain of T2 and the gate of T3 is connected to the second or sensor capacitor C2 of both array elements 100 and 102. Such a configuration permits T2 and T3 (and VPIX) to operate in a shared manner for both array elements 100 and 102, thereby permitting the reset signal (RST) and power supply (VCCA) to operate commonly for the multiple rows, with the sensor output being read via the sensor output line COL.

Figure 6:
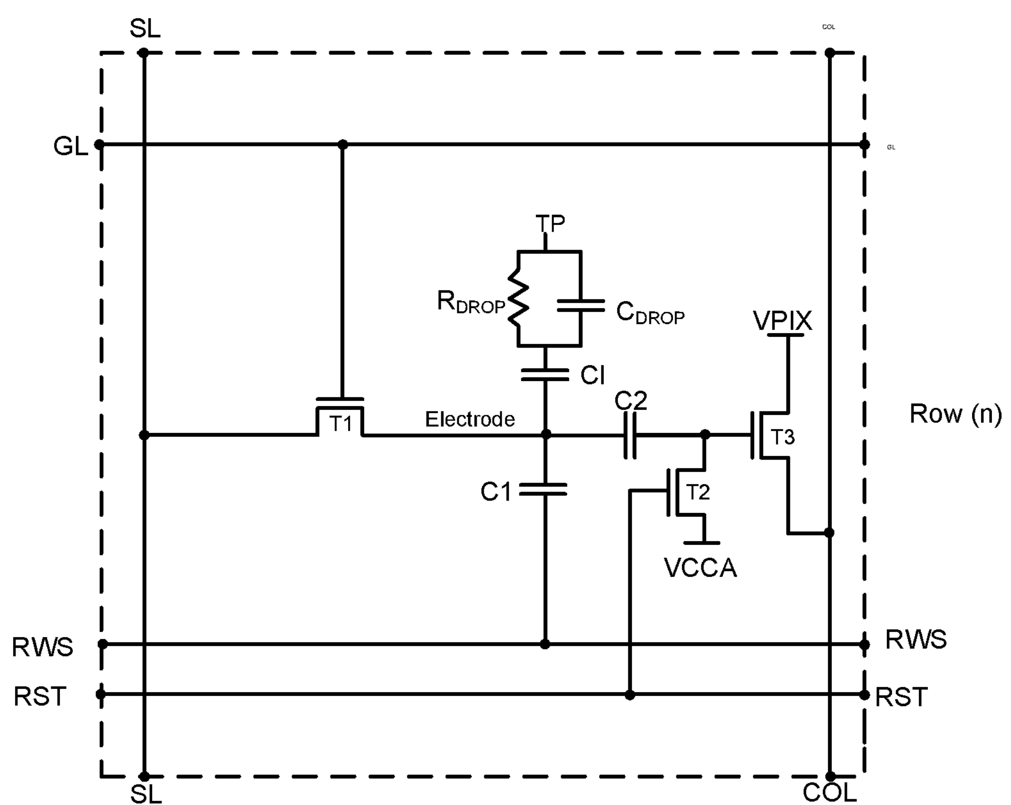
FIG. 6 is a drawing depicting an array element including exemplary array element circuitry for an AM-EWOD device that embodies a previous design of Applicant.
Figure 7:
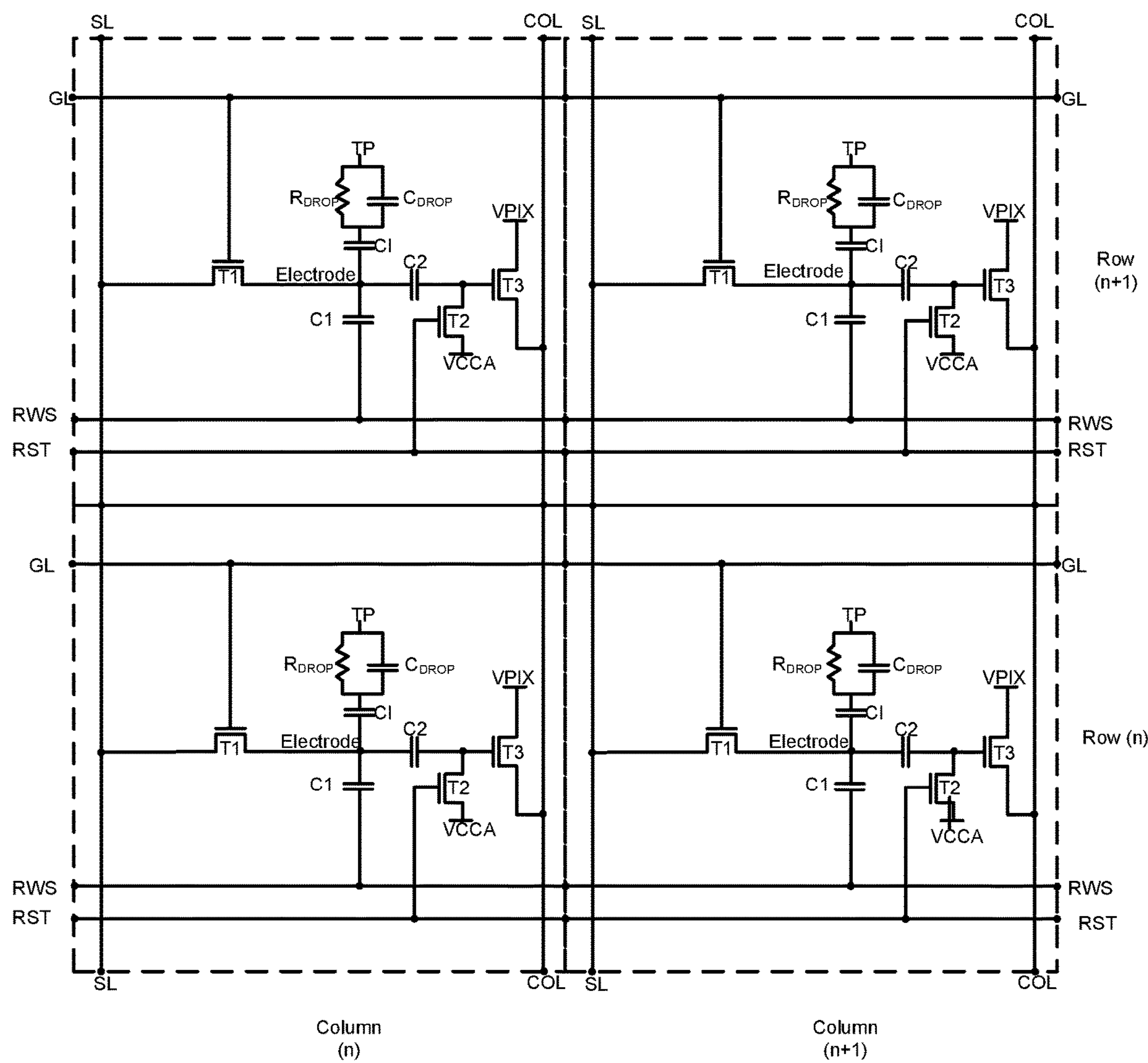
FIG. 7 is a drawing depicting a plurality of array elements of FIG. 6 configured as a 2×2 element array.

Programming and actuation occurs comparably as in the previous design of FIGS. 6 and 7. To program a given array element 100 or 102 by writing voltage data to said array element, the actuation voltage to be programmed is loaded onto addressing line SL, and a pulse is applied to the gate line GL appropriate for the row being programmed, which in this example is either Row(n) or Row(n+1). This turns on T1 in the selected row, and the circuit node connected to the electrode is charged to the programmed voltage. When GL is taken low, this voltage is preserved, stored on the storage capacitor C1 which provides the actuation voltage to the array element electrode. Typically, C1 is larger than C2 by at least about an order of magnitude as referenced in connection with FIG. 6.

To perform sensing, in a reset step the reset transistor T2 is turned on by a reset signal RST, so the gate of sensor readout transistor T3 charges to VCCA. VCCA is a reset potential chosen below the threshold voltage of the sensor readout transistor T3 such that T3 remains off while any previous residual voltage is cleared. Each array element is sensed independently. In a sensing step for sensor Row(n), addressing line RWS for Row(n) is pulsed. For the duration of the RWS(n) pulse, the electrode potential for array element 100 of Row(n) is perturbed to a higher voltage. As before, the change in voltage achieved is principally a function of the ratio of storage capacitor C1 to the total capacitance at the electrode, which includes the load associated with whether the droplet is present or absent. The perturbation is coupled through the sensor capacitor C2 of Row(n) to the gate of the sensor readout transistor T3, and transistor T3 is accordingly turned on to an extent determined by the amplitude of the pulse as coupled, which generates a current supplied from the power supply VPIX. The resultant current from array element 100 passes through T3 and is sunk down the output line COL, which may then be sensed by column detection circuitry at the bottom of the column (not shown).

The sensing operation is then repeated for Row(n+1), which is performed by pulsing the addressing line RWS for Row(n+1). Accordingly, in a reset step the reset transistor T2 again is turned on by an RST signal, so the gate of the sensor output transistor T3 charges to VCCA. In a sensing step for sensor Row(n+1), addressing line RWS for Row(n+1) is pulsed. For the duration of the RWS(n+1) pulse, the electrode potential for array element 102 of Row(n+1) is perturbed to a higher voltage. As before, the change in voltage achieved is principally a function of the ratio of capacitor C1 to the total capacitance at the electrode, which includes the load associated with whether the droplet is present or absent. The perturbation is coupled through C2 of Row(n+1) to the gate of the sensor readout transistor T3, and transistor T3 is accordingly turned on to an extent determined by the amplitude of the pulse as coupled, which generates a current supplied from the power supply VPIX. The resultant current from array element 102 passes through T3 and is sunk down output line COL, which may then be sensed by column detection circuitry at the bottom of the column (not shown).

As seen in the timing diagram of FIG. 11, the level of the voltage at the gate of the sensor readout transistor T3, and thus the resultant current sunk down the output line COL, is dependent upon whether a droplet is present or absent. For each array element 100 and 102, therefore, the presence or absence of a droplet is sensed.

In this manner, the array elements in Row(n) and Row (n+1) are sensed separately and independently, with components T2 and T3 (and the associated voltage supply lines for VPIX and VCCA) being shared between the array elements of the two rows. This results in a reduction of the component count, which reduces the size of the array element circuitry and in turn the overall device size. There is no loss of sensor resolution, as each array element is sensed one at a time in sequence (e.g., Row(n) and then Row(n+1). Row selection is achieved by means of the addressing lines RWS for each row in turn. While the addressing line RWS to Row(n) is pulsed, the addressing line RWS to Row(n+1) is maintained static, and vice versa. Accordingly, a signal is coupled across sensor capacitor C2 only in the row for which the RWS signal is being applied. The two shared rows do not necessarily need to be spatially adjacent as shown in FIG. 10, but practically this is easiest to arrange. The result is to reduce the number components in the combined circuitry for array elements 100 and 102.

Figure 12:
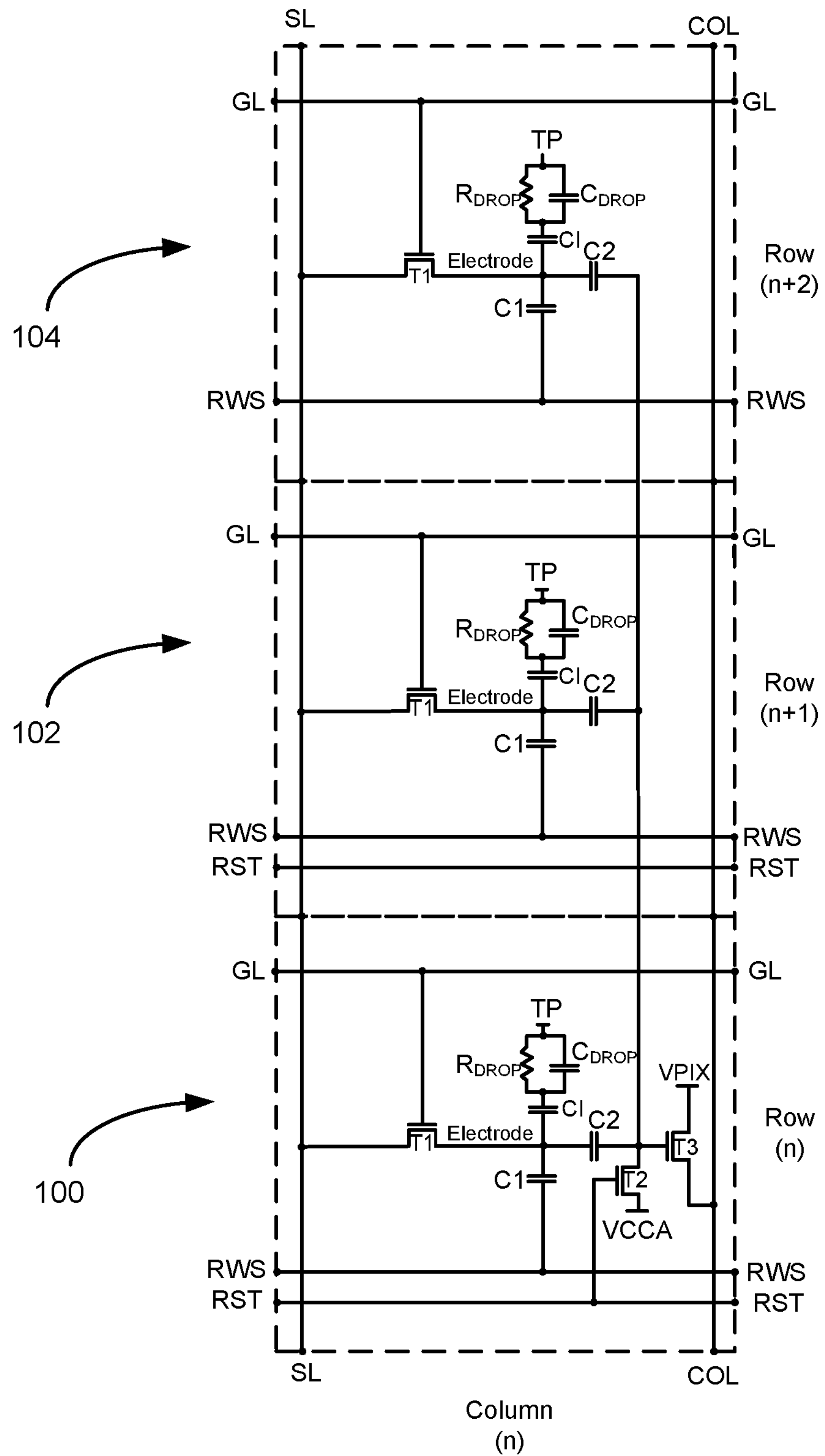
FIG. 12 is a drawing depicting another configuration of a plurality of array elements including exemplary array element circuitry for an AM-EWOD device, which is a modification of the embodiment of FIG. 10.
Figure 13:
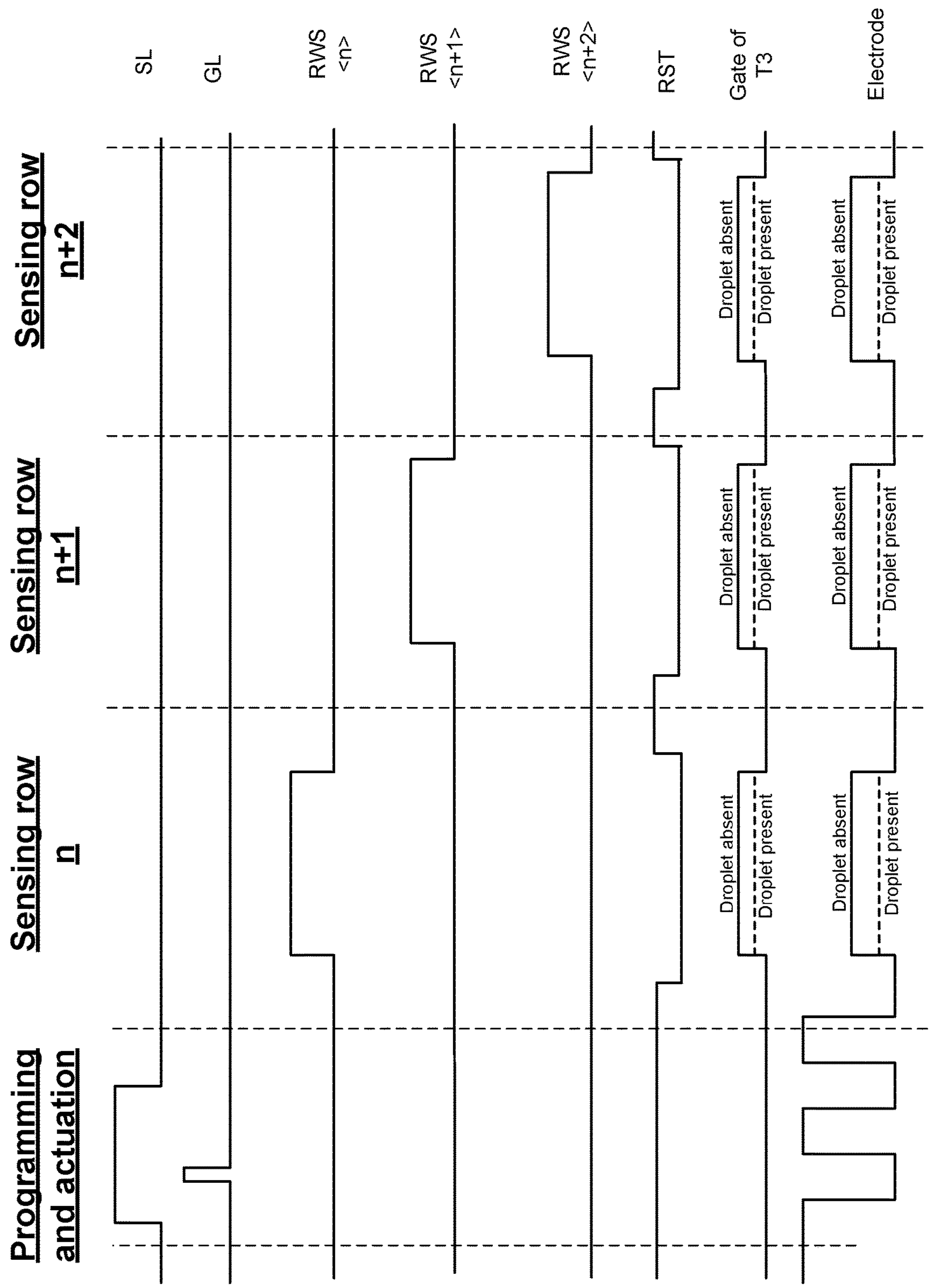
FIG. 13 is a timing diagram that illustrates the operation of embodiment of FIG. 12.

FIG. 12 is a drawing depicting another configuration of a plurality of array elements including exemplary array element circuitry for an AM-EWOD device. FIG. 13 is a timing diagram that illustrates the operation of the embodiment of FIG. 12. The configuration of FIG. 12 is comparable to that of FIG. 10, except that in the embodiment of FIG. 12 the reset transistor T2 and the sensor readout transistor T23 are shared among three array elements including the first array element 100, the second array element 102, and additionally a third array element 104 positioned in adjacent rows, respectively Row(n) and Row(n+1) and Row(n+2). In this embodiment, therefore, the reset transistor T2 and the sensor readout transistor T3 operate in a shared manner for the three array elements 100, 102, and 104. The programming, actuation, and sensing of Row(n) and Row(n+1) proceed comparably as in the embodiment of FIGS. 10 and 11, and the array element of Row(n+2) can be programmed and actuated in a comparable manner. In the embodiment of FIGS. 12 and 13, a next sequential sensing step is performed as to Row (n+2).

After the sensing operation is performed for Row(n+1), therefore, the sensing operation is then repeated for Row (n+2), which is performed by pulsing addressing line RWS for Row(n+2). Accordingly, in a reset step the reset transistor T2 again is turned on by an RST signal, so the gate of the sensor output transistor T3 charges to VCCA. In a sensing step for sensing Row(n+2), addressing line RWS for Row (n+2) is pulsed. For the duration of the RWS(n+2) pulse, the electrode potential for array element 104 of Row(n+2) is perturbed to a higher voltage. As before, the change in voltage achieved is principally a function of the ratio of capacitor C1 to the total capacitance at the electrode, which includes the load associated with whether the droplet is present or absent. The perturbation is coupled through C2 of Row(n+2) to the gate of the sensor output transistor T3, and transistor T3 is accordingly turned on to an extent determined by the amplitude of the pulse as coupled, which generates a current supplied from the power supply VPIX. The resultant current from array element 104 passes through T3 and is sunk down the output line COL, which may then be sensed by column detection circuitry at the bottom of the column (not shown).

As seen in the timing diagram of FIG. 13 similarly as in FIG. 11, the level of the voltage at the gate of the sensor readout transistor T3, and thus the resultant current sunk down the output line COL, is dependent upon whether a droplet is present or absent. For each array element 100, 102, and 104, therefore, the presence or absence of a droplet is sensed. Similarly, while a given row is sensed by pulsing the respective RWS line, the RWS lines of the other rows are held static, such that each row is sensed independently and sequentially.

The embodiment of FIGS. 12 and 13 illustrates generally that sharing of T2 and T3 may occur as between any number of rows of two or more to reduce the component count of the overall device. In practice, sharing such components among more than three rows may have practical limitations in that the wiring that would be used to connect all the rows relative to the shared impedance sensor circuitry components may result in taking up more space than is saved by the elimination of circuit components. Accordingly, in a large array of N rows by M columns, the preferred embodiments employ sharing of components in groups of two or three adjacent rows as shown in FIGS. 10 and 12.

Figure 8:
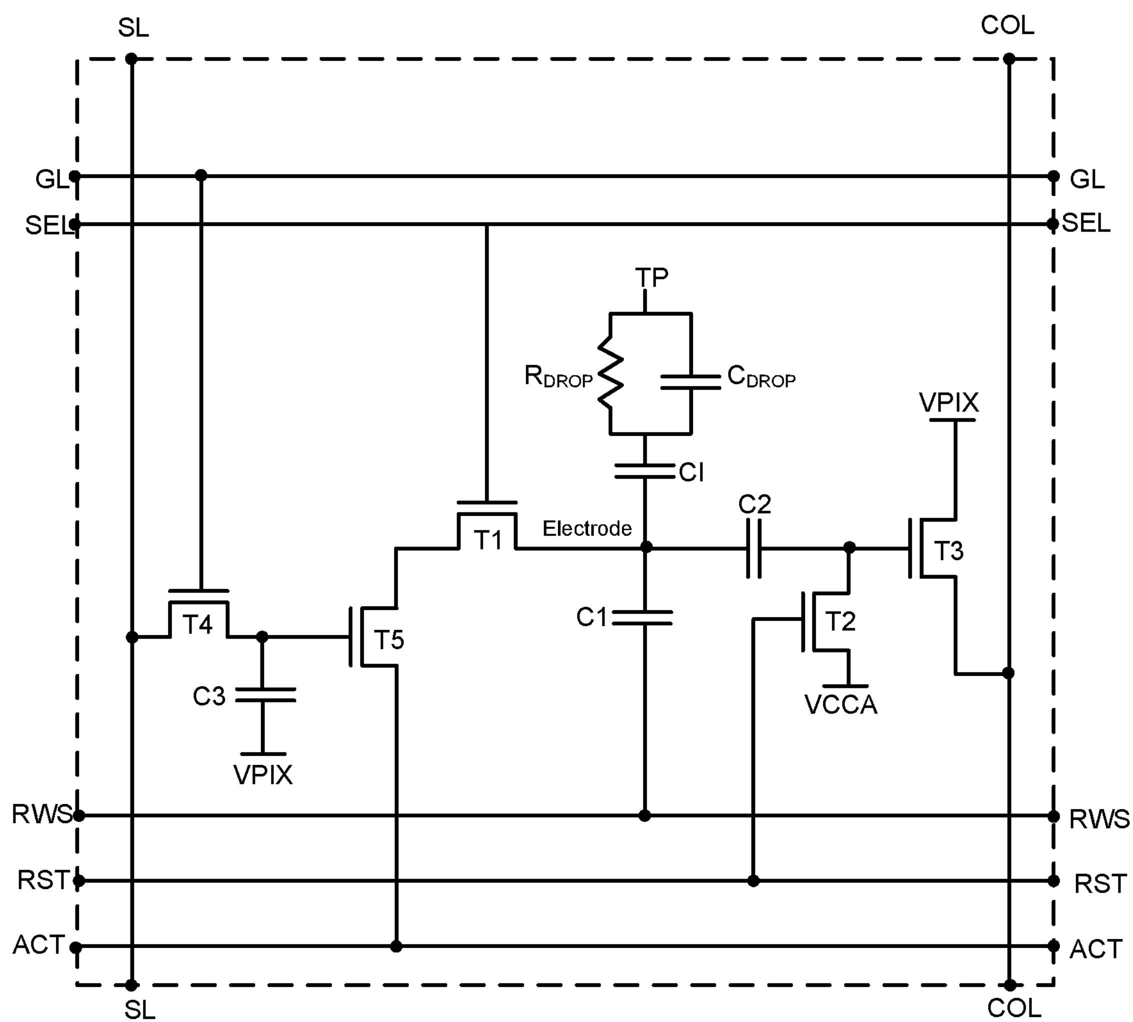
FIG. 8 is a drawing depicting an array element including exemplary array element circuitry for an AM-EWOD device that embodies another previous design of Applicant.
Figure 14:
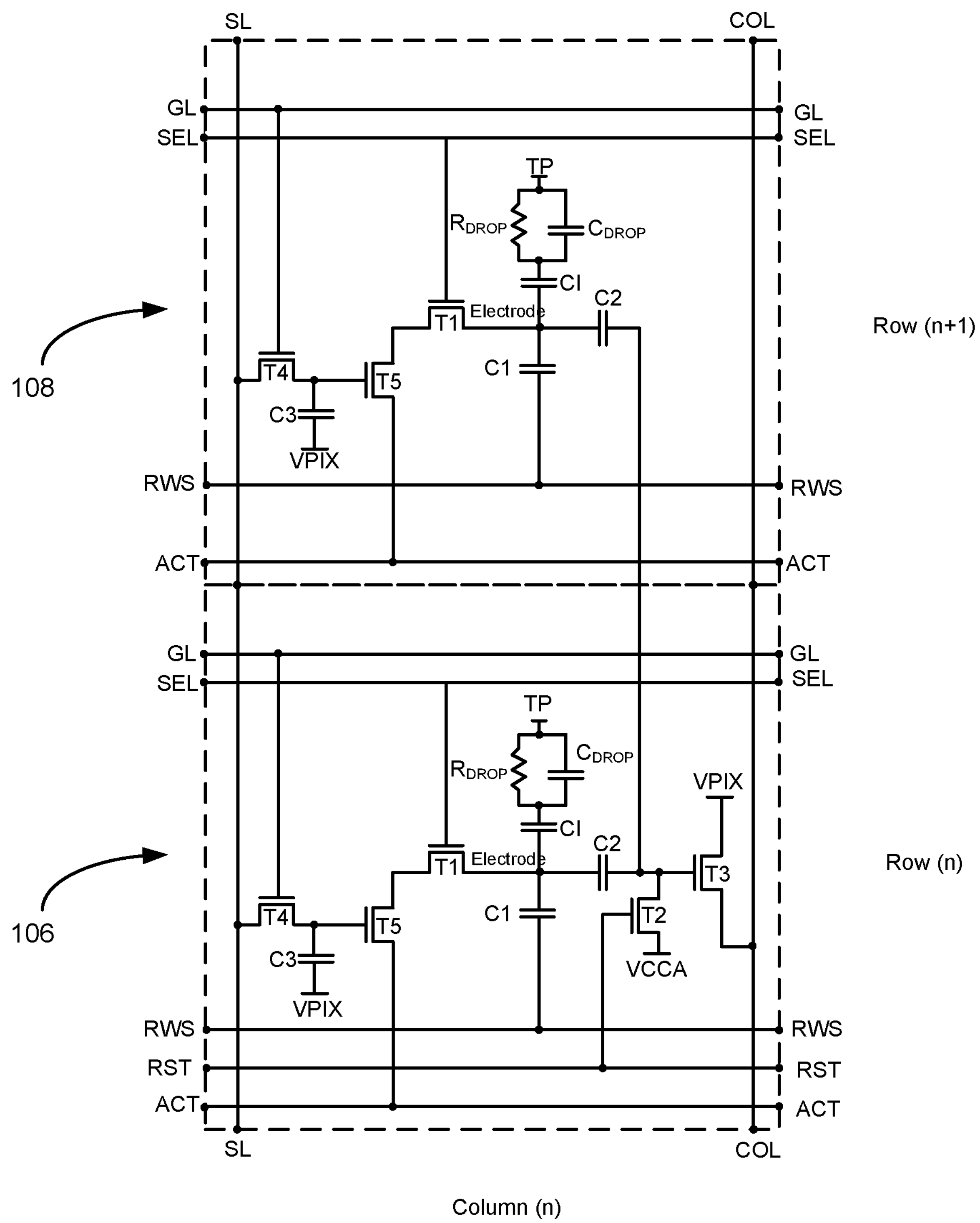
FIG. 14 is a drawing depicting a plurality of array elements including exemplary array element circuitry for an AM-EWOD, which provides an enhanced circuit configuration that improves over the configuration depicted in FIG. 8.
Figure 15:
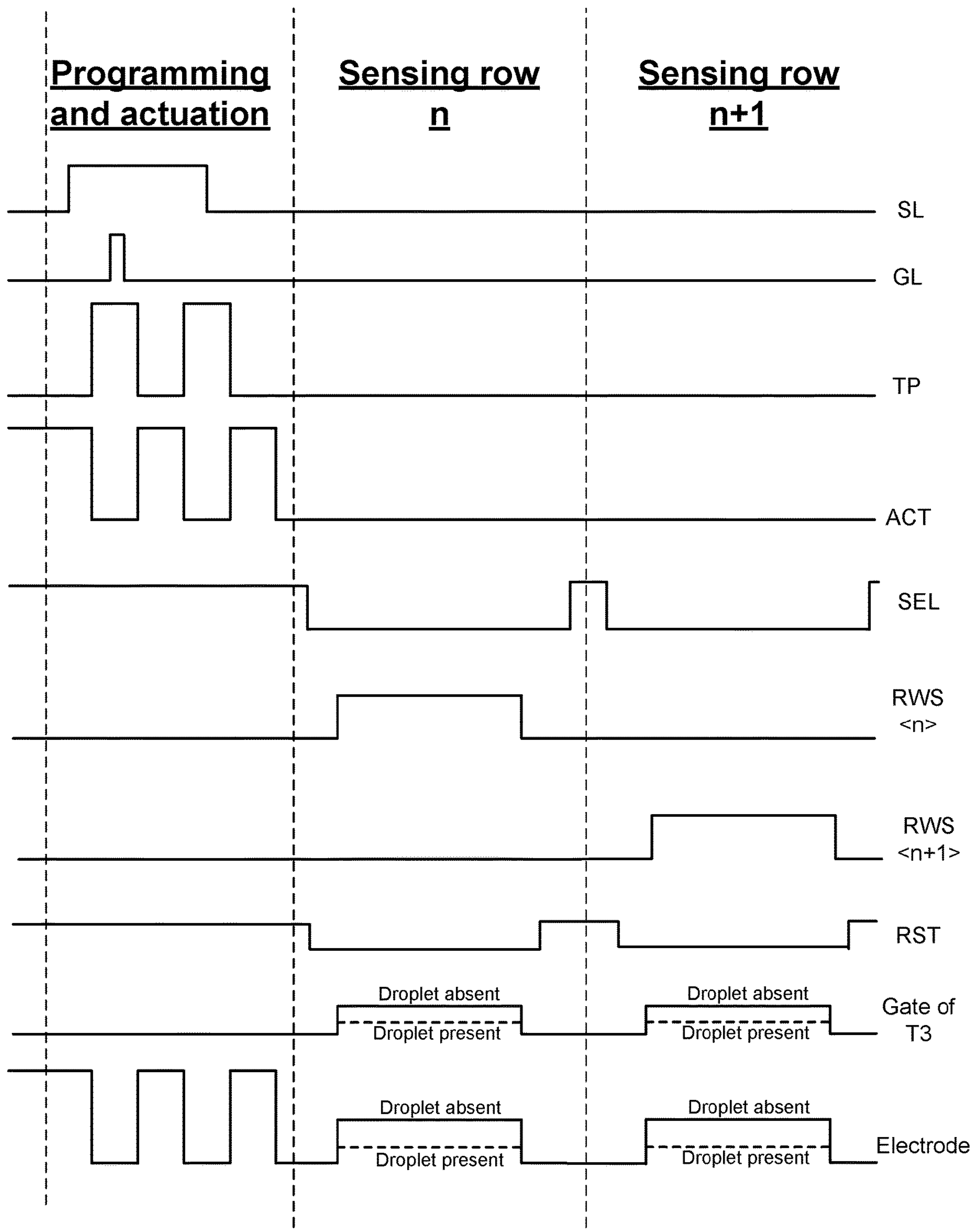
FIG. 15 is a timing diagram that illustrates the operation of the embodiment of FIG. 14.

The described modification of integrated impedance sensor circuitry, in which the reset transistor and the sensor readout transistor are shared by array elements in adjacent rows, can be combined with any suitable actuation circuitry. For example, FIG. 14 is a drawing depicting a plurality of array elements including exemplary array element circuitry for an AM-EWOD device, which provides an enhanced circuit configuration that improves over the configuration depicted in FIG. 8. FIG. 15 is a timing diagram that illustrates the operation of the embodiment of FIG. 14. FIG. 14, therefore, also depicts a pair of array elements including a first array element 106 and a second array element 108 positioned in adjacent rows, respectively Row(n) and Row (n+1). Generally, the embodiment of FIG. 14 is a modification of the circuit configuration of FIG. 8, with the reset transistor T2 and the sensor readout transistor T3 again operating in a shared manner for both array elements in adjacent rows similarly as in the previous embodiment.

Because the impedance sensor circuitry with shared components of FIG. 14 is comparable to that of FIGS. 10 and 12, sensing operation is largely the same, with operational differences mainly being in the programming and actuation phase due to the different configuration of the actuation circuitry. The actuation and programming of such circuit configuration is described in Applicant's commonly assigned US 2017/0076676 referenced above, and is illustrated in the timing diagram of FIG. 15. To program a given array element 106 or 108 by writing voltage data to said array element, a voltage is loaded onto addressing line SL, and a pulse is applied to the gate line GL appropriate for the row being programmed, which in this example is either Row(n) or Row(n+1). This turns on T4 in the selected row, and the circuit node connected to the electrode is charged to the voltage pulse on the SL line. When GL is taken low, this voltage is preserved, stored on the additional capacitor C3. With this arrangement, the stored voltage on C3 determines whether transistor T5 is on, and an additional select line SEL operates to turn on transistor T1 for actuation. With T5 and T1 both on, the electrode element is connected to the desired actuation voltage ACT. As shown in the timing diagram, this arrangement is particularly suitable for an AC actuation voltage as the SL voltage is merely a switching pulse, and an additional AC actuation voltage can be applied along the separate line ACT.

For sensing a given row, the select line SEL is taken low for that row to turn off T1. This isolates the respective array element from the actuation voltage during the sensing period. Sensing then proceeds otherwise as in the previous embodiment. To perform sensing, in a reset step the reset transistor T2 is turned on by a reset signal RST, so the gate of sensor readout transistor T3 charges to VCCA. Addressing line RWS for Row(n) is pulsed to perturb the voltage at C1, which is coupled through C2 to the gate of the sensor readout transistor T3. Transistor T3 is accordingly turned on to an extent determined by the amplitude of the pulse as coupled, which is dependent upon the presence or absence of a droplet, and which generates a current supplied from the power supply VP IX. The resultant current from array element 106 passes through T3 and is sunk down the output line COL for sensing. The sensing operation is then repeated for Row(n+1) to generate the output current from array element 108 to the output line COL. As seen in the timing diagram of FIG. 15, the level of the voltage at the gate of the sensor output transistor T3, and thus the resultant current sunk down the output line COL, is dependent upon whether a droplet is present or absent in a given array element. The sharing of the reset transistor and sensor readout transistor may be expanded to sharing among more than two array elements, comparably as described with respect to FIGS. 12 and 13.

Figure 9:
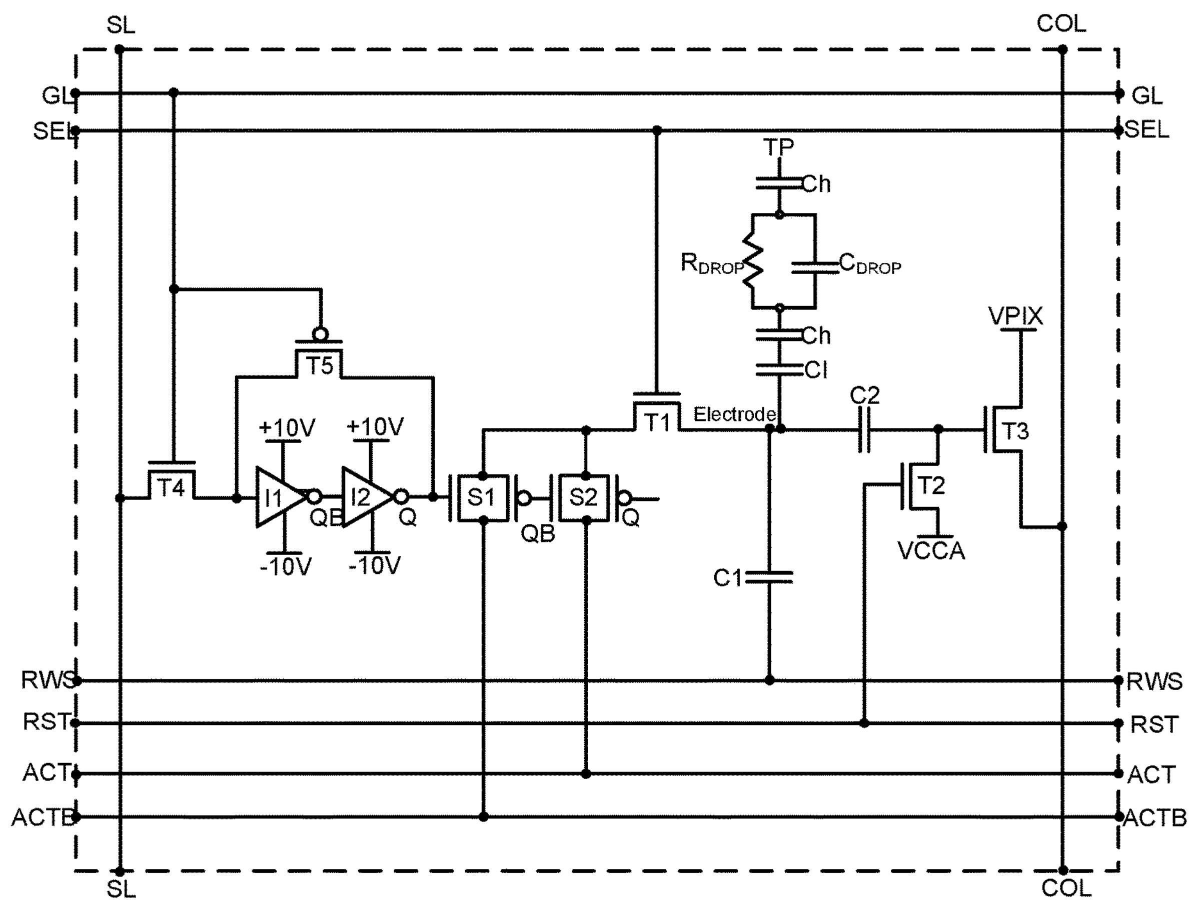
FIG. 9 is a drawing depicting an array element including exemplary array element circuitry for an AM-EWOD device that embodies another previous design of Applicant.
Figure 16:
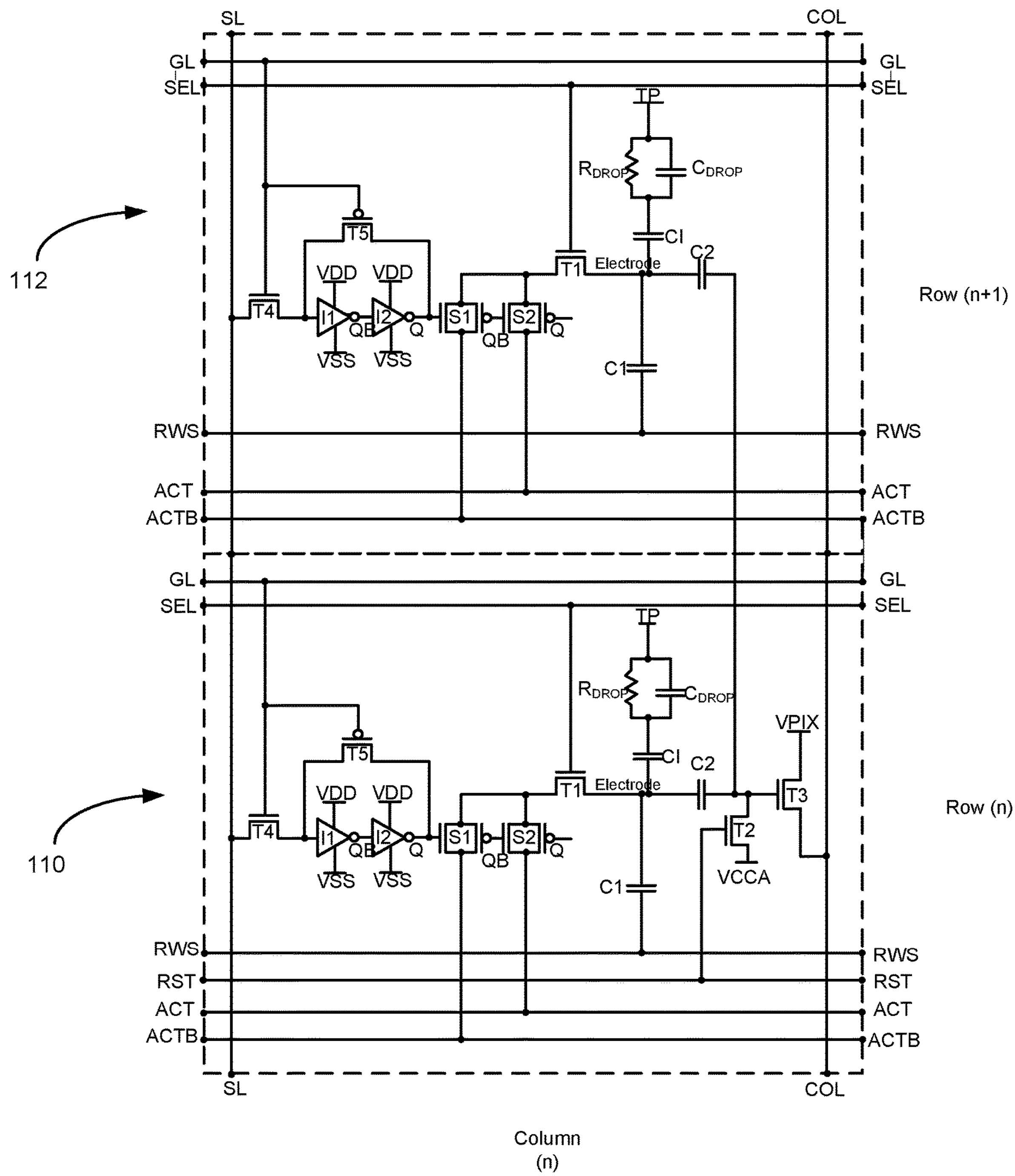
FIG. 16 is a drawing depicting a plurality of array elements including exemplary array element circuitry for an AM-EWOD, which provides an enhanced circuit configuration that improves over the configuration depicted in FIG. 9.
Figure 17:
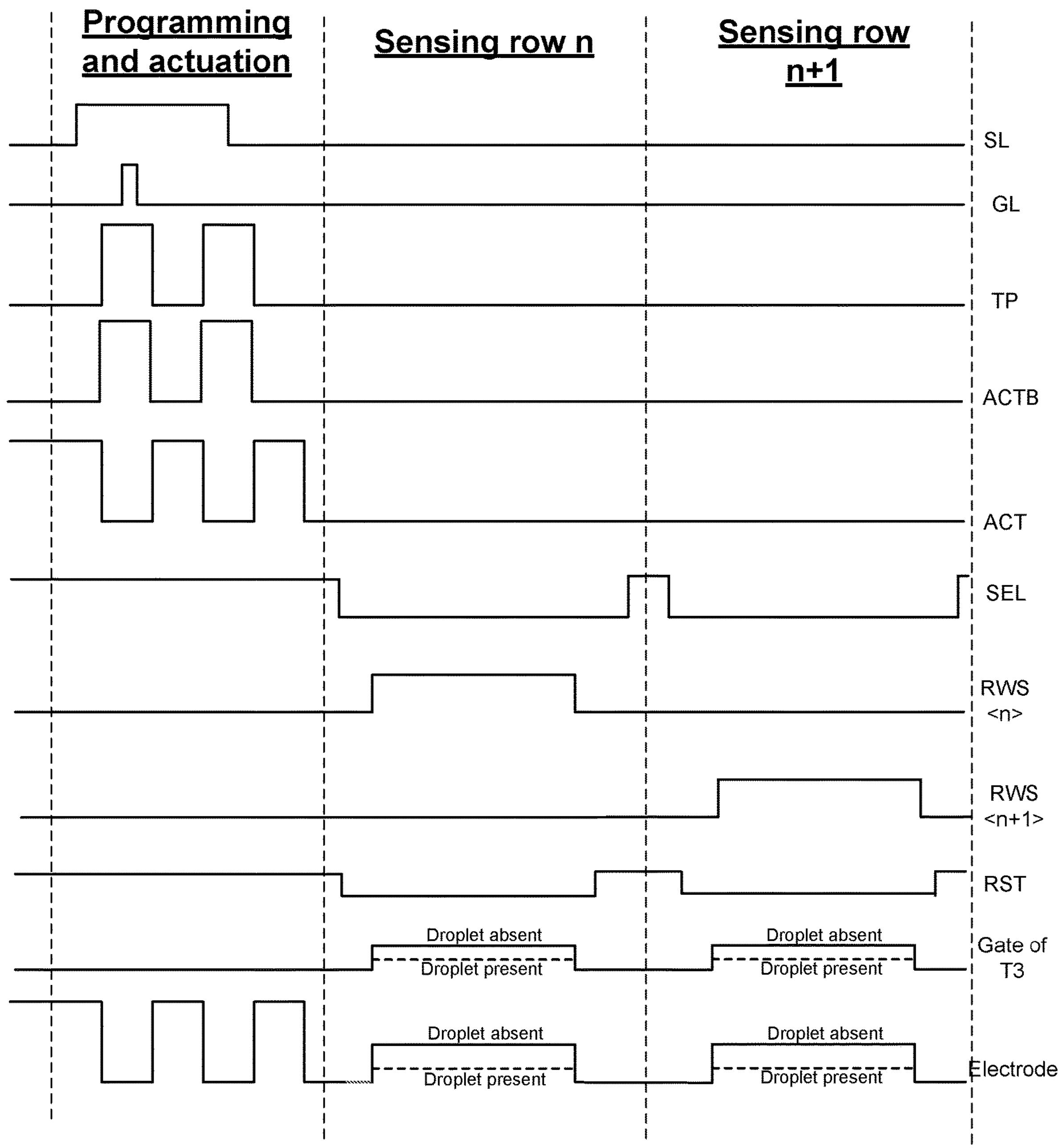
FIG. 17 is a timing diagram that illustrates the operation of the embodiment of FIG. 16.

As another example of combining impedance sensor circuitry having shared components with different actuation circuitry, FIG. 16 is a drawing depicting a plurality of array elements including exemplary array element circuitry for an AM-EWOD device, which provides an enhanced circuit configuration that improves over the configuration depicted in FIG. 9. FIG. 17 is a timing diagram that illustrates the operation of the embodiment of FIG. 16. FIG. 16, therefore, also depicts a pair of array elements including a first array element 110 and a second array element 112 positioned in adjacent rows, respectively Row(n) and Row(n+1). Generally, the embodiment of FIG. 16 is a modification of the circuit configuration of FIG. 9, with the reset transistor T2 and the sensor readout transistor T3 again operating in a shared manner for both array elements similarly as in the previous embodiment.

Because the impedance sensor circuitry of FIG. 16 is comparable to that of FIGS. 10, 12, and 14, the sensing operation is largely the same, with operational differences mainly being in the programming and actuation phase due to the different configuration of the actuation circuitry. The actuation and programming of such circuit configuration is described in Applicant's commonly assigned U.S. Pat. No. 8,173,000 referenced above, and is illustrated in the timing diagram of FIG. 17. To program a given array element 110 or 112 by writing voltage data to said array element, voltage pulse is supplied onto addressing line SL, and a pulse is applied to the gate line GL appropriate for the row being programmed, which in this example is either Row(n) or Row(n+1). This turns on T4 in the selected row, and the circuit node connected to the electrode is charged to the SL pulse voltage. The line GL also is connected to the p-type transistor T5 to control flow of current through or across the inverters 11 and 12, and in combination with the analogue switches S1 and S2 operate to apply either actuation voltage ACT or ACTB to the transistor T1. An additional select line SEL operates to turn on T1 for actuation by either ACT or ACTB as outputted by the actuation circuitry. With this configuration, a more various set of actuation voltages can be supplied, which may be more suitable for certain applications.

Similarly as in the previous embodiments, for sensing a given row the select line SEL is taken low for that row to turn off T1. This isolates the respective array element from the actuation voltage during the sensing period. Sensing then proceeds otherwise as in the previous embodiments. To perform sensing, in a reset step the reset transistor T2 is turned on by a reset signal RST, so the gate of sensor readout transistor T3 charges to VCCA. Addressing line RWS for Row(n) is pulsed to perturb the voltage at C1, which is coupled through C2 to the gate of the sensor readout transistor T3. Transistor T3 is accordingly turned on to an extent determined by the amplitude of the pulse as coupled, which is dependent upon the presence or absence of a droplet, and which generates a current supplied from the power supply VPIX. The resultant current from array element 110 passes through T3 and is sunk down the output line COL for sensing. The sensing operation is then repeated for Row(n+1) to generate the output current from array element 112 to the output line COL. As seen in the timing diagram of FIG. 17, the level of the voltage at the gate of the sensor output transistor T3, and thus the resultant current sunk down the output line COL, again is dependent upon whether a droplet is present or absent in a given array element. The sharing of the reset transistor and sensor readout transistor may be expanded to sharing among more than two array elements, comparably as described with respect to FIGS. 12 and 13.

In other exemplary embodiments, the sensor readout line COL is common between two array elements in adjacent columns. The two array elements may have different circuit configurations, and the control signals are appropriately timed for sharing the sensor readout. The sharing of the sensor readout line may be combined with previous embodiments in which circuit components are shared by array elements of adjacent rows to further simplify array element circuitry.

Figure 18:
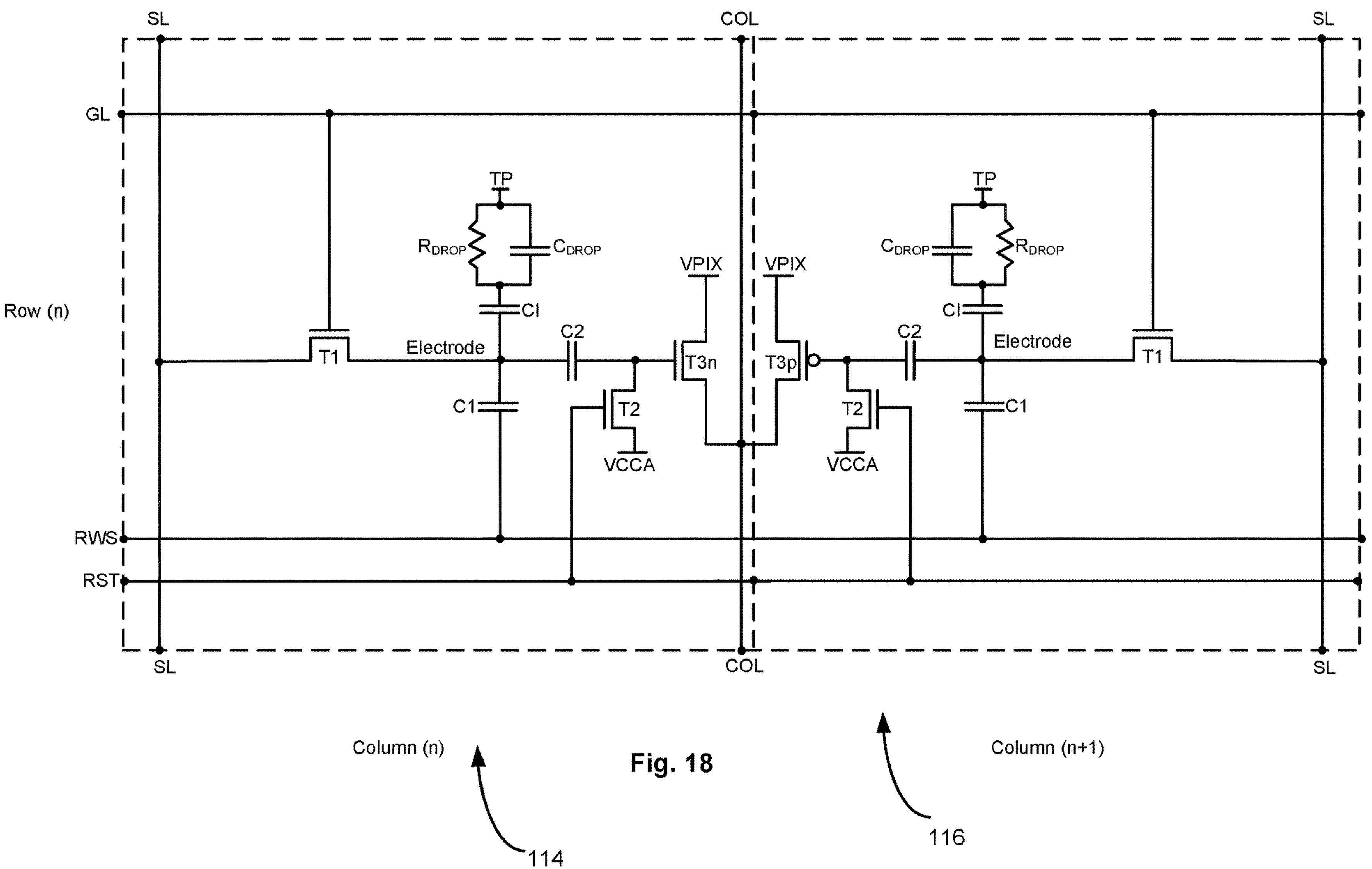
FIG. 18 is a drawing depicting a plurality of array elements including exemplary array element circuitry for an AM-EWOD device, which provides a variation of the circuit configuration depicted in FIG. 10.
Figure 19:
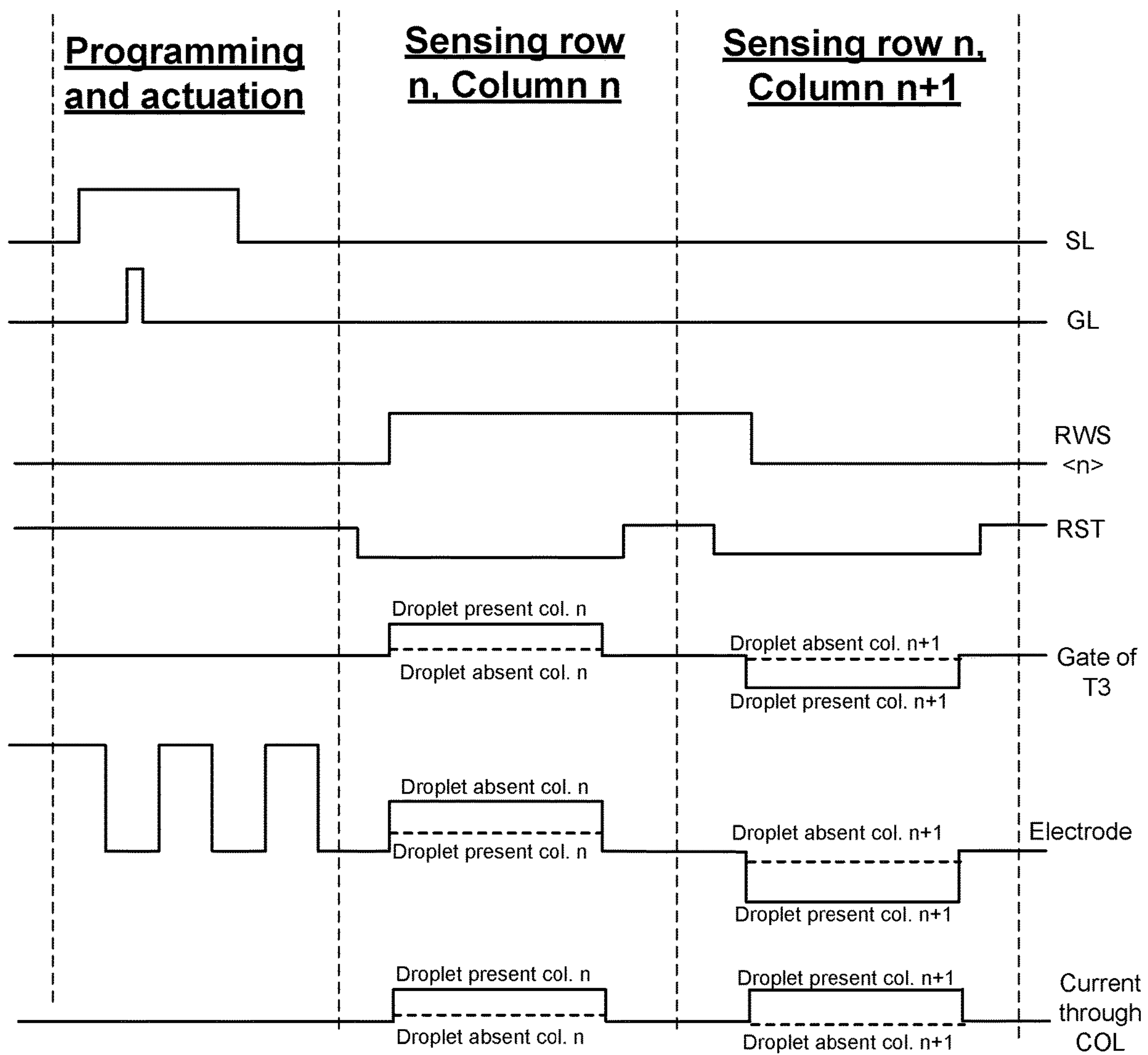
FIG. 19 is a timing diagram that illustrates the operation of the embodiment of FIG. 18.

As an example of such embodiments, FIG. 18 is a drawing depicting a plurality of array elements including exemplary array element circuitry for an AM-EWOD device, which provides a variation of the circuit configuration depicted in FIG. 10 (which again is based on the configuration of FIGS. 6 and 7). Comparable principles may be applied to circuit configurations having alternative actuation circuitry, such as for example described with respect to FIGS. 14 and 16. FIG. 19 is a timing diagram that illustrates the operation of the embodiment of FIG. 18. FIG. 18 depicts a pair of array elements including a first array element 114 and a second array element 116 positioned in adjacent columns, respectively Column(n) and Column(n+1). Generally, the embodiment of FIG. 18 is a modification of the circuit configuration of FIGS. 6, 7, and 10, but with the array elements of adjacent columns being "mirror image" relative to each other to share the sensor output line COL.

To achieve appropriately timed outputs from each array element down the same output line, the first array element 114 of Column(n) has an n-type sensor readout transistor (denoted T3*n*), and the second array element 116 of Column (n+1) has a p-type sensor readout transistor (denoted T3*p*). The architecture and timing are basically arranged so that in a first sensor operation, Column(n) is sensed with Column (n+1) having no effect, and in a second sensor operation Column(n+1) is sensed with Column(n) having no effect. In other words, while performing the sensing operation on the first array element, there is no output current from the second array element, and while performing the sensing operation on the second array element, there is no output current from the first array element Programming occurs comparably as in the previous design of FIG. 10. To program a given array element 114 or 116 by writing voltage data to said array element, the voltage to be programmed is loaded onto addressing line SL, and a pulse is applied to the gate line GL appropriate for row being programmed. As these elements are in the same row, they share a GL line, and addressing line SL of each array element applies the appropriate programmed voltage to Column(n) and Column(n+1). The GL pulse turns on T1 as in previous embodiments in the selected row, and the circuit node connected to the electrode is charged to the programmed voltage. When GL is taken low, this voltage is preserved, stored on capacitor C1 to constitute the actuation voltage for the array element.

To perform sensing, in a reset step the reset transistor T2 in each array element is turned on by a shared reset signal RST, so the gate of sensor readout transistors T3*n* and T3*p* are both charge to VCCA. As in previous embodiments, VCCA is a reset potential chosen below the threshold voltages of the sensor readout transistors such that T3*n* and T3*p* remain off while any previous residual voltage is cleared.

When sensing Column(n), Row(n), the voltage at the common electrode is taken high with a positive RWS pulse while RST is low. The result of this pulse is that the potential of the electrode and at the gate of T3*n* is perturbed in a positive direction, by a large amount if a droplet is present at the electrode of the first array element, and by a small amount if no droplet is present at the electrode. Likewise, the potential at the gate of T3*b* is also perturbed in a positive direction in a comparable manner at the electrode of Column (n+1), Row(n) depending up the presence of a droplet at the second array element. In Column(n) having the n-type sensor readout transistor T3*n*, the positive perturbation of the T3*n* gate potential causes this transistor to be switched on and an output current to be sunk through the shared sensor output line COL, which represents the capacitance at the electrode of the first array element 114 at Column(n), Row(n). By contrast, in Column(n+1) with the second array element 116 having the p-type readout transistor T3*p*, the positive perturbation at the gate of T3*b* has no effect because as a p-type transistor, a positive going perturbation turns T3*p* further into the off region.

Figure 20:
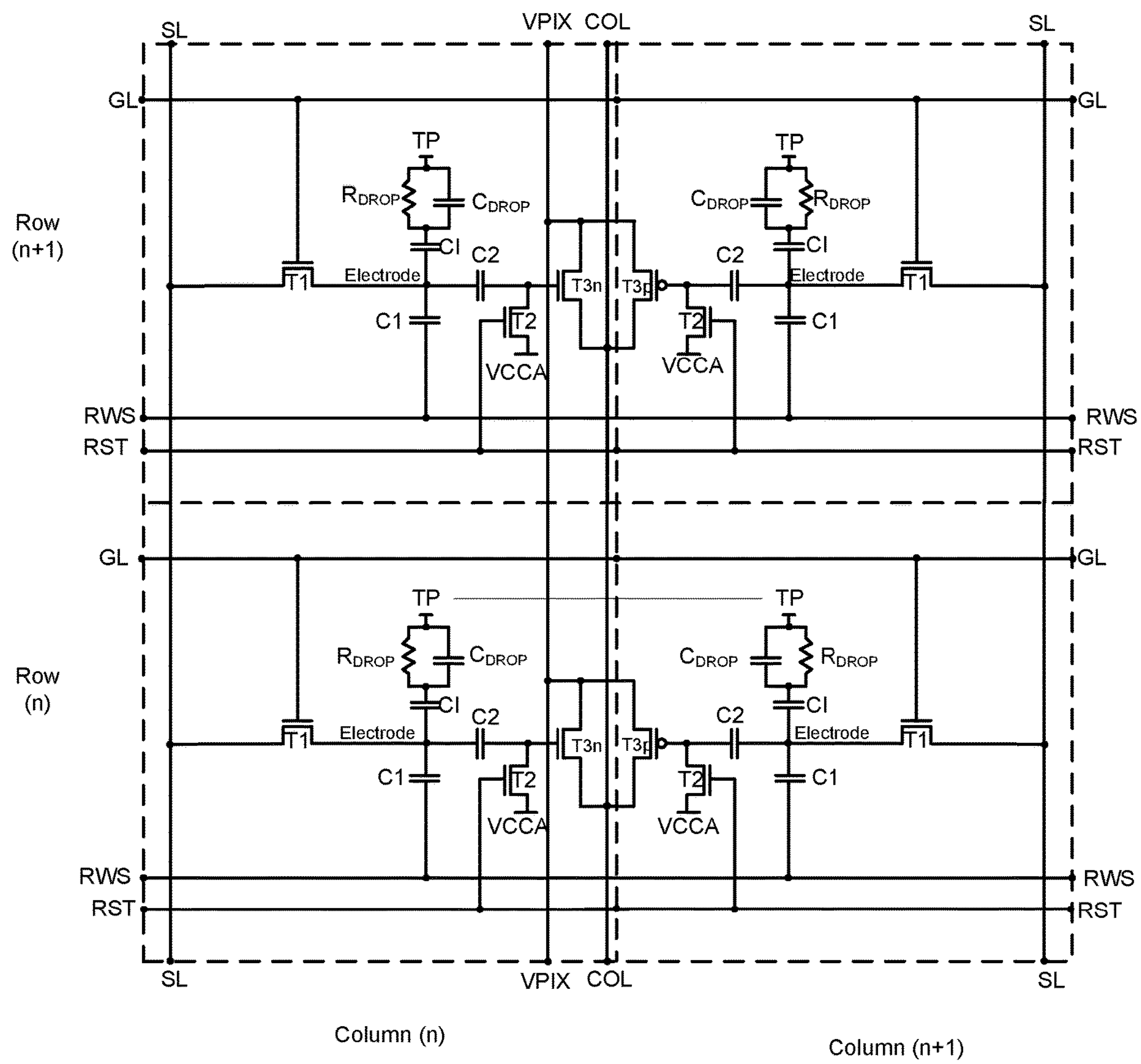
FIG. 20 is a drawing depicting array elements comparably as depicted in FIG. 18, expanded to illustrate a 2×2 array configuration of such elements.

When sensing Column(n+1), Row(n), the reset RST high is initially applied with the electrode also at a high voltage. The gate potential of T3*n* and T3*p* are both reset to the reset potential. The voltage on the electrode is then taken low by a negative RWS pulse. As a result, if a droplet is present at the electrode of Column(n), Row(n), the potential of the electrode and of the gate of T3*n* is perturbed to a more negative voltage, but a negative perturbation maintains T3$n$ in the off region. Similarly, if a droplet is present at the electrode of Column(n+1), Row(n), the potential of the electrode and of the gate of T3$p$ also is perturbed to a more negative voltage. The negative perturbation of the T3$p$ gate potential causes this transistor to be switched on and an output current to be sunk through the shared sensor output line COL, which represents the capacitance at the electrode of the second array element 116 at Column(n+1), Row(n). By contrast, in Column(n) with the first array element 114 having the n-type readout transistor T3$n$, the negative perturbation at the gate of T3$n$ has no effect because as an n-type transistor, a negative going perturbation turns T3$n$ further into the off region. In this manner, the array elements in Column(n) and Column(n+1) are sensed separately and independently while sharing a common sensor output line COL. In other words, with such configuration while performing the sensing operation on the first array element, there is no output current from the second array element, and while performing the sensing operation on the second array element, there is no output current from the first array element FIG. 20 is a drawing depicting array elements comparably as depicted in FIG. 18, expanded to illustrate a 2×2 array configuration of such elements. This configuration illustrates how the addressing lines for power supply lines may be shared between pixels in adjacent rows and/or columns. In this example, the power supply line for VPIX spans the two rows Row(n) and Row(n+1). In addition, the power supply VPIX of Column(n) and Column(n+1) likewise is supplied by a single addressing line connecting to both columns, in particular via a connection between the source terminals of T3$n$ and T3$p$ in adjacent columns. Comparable principles for shared power supplies may be employed for power supply lines in any of the embodiments, including for example VCCA and VPIX in the various embodiments, as well as VSS and VDD in the embodiment of FIG. 16.

The embodiments described herein have advantages in providing simpler array element circuitry as compared to conventional configurations. The described embodiments, therefore, have a reduced number of components and/or number of addressing lines, which can improve yield and/or permit a smaller physical size of the array elements.

An aspect of the invention, therefore, is an AM-EWOD device having enhanced array element circuitry by providing a shared component of the impedance sensor circuitry of multiple array elements. In exemplary embodiments, an AM-EWOD device includes a plurality of array elements arranged in an array of rows and columns, each of the array elements including array element circuitry, an element electrode, and a reference electrode. The array element circuitry includes actuation circuitry configured to apply actuation voltages to the element and reference electrodes for actuating the array element; and impedance sensor circuitry configured to sense impedance at the array element electrode to determine a droplet property at the array element, wherein at least one component of the impedance sensor circuitry is a shared component that is shared between more than one of the array elements. The AM-EWOD device may include one or more of the following features, either individually or in combination.

In an exemplary embodiment of the AM-EWOD device, the shared component comprises a shared sensor readout transistor that passes a sensor current to a sensor output line.

In an exemplary embodiment of the AM-EWOD device, the shared component further comprises a shared reset transistor that applies a reset voltage to a gate of the shared sensor readout transistor.

In an exemplary embodiment of the AM-EWOD device, the impedance sensor circuitry of each array element includes a sensor capacitor, and a gate of the shared sensor readout transistor is electrically connected to the sensor capacitor of each of the more than one of the array elements.

In an exemplary embodiment of the AM-EWOD device, the impedance sensor circuitry of each array element further includes a storage capacitor connected to the sensor capacitor oppositely from the shared sensor readout transistor; and a voltage pulse applied to the storage capacitor of a respective array element is coupled through the sensor capacitor to the shared sensor readout transistor while a voltage applied to storage capacitors of others of the more than one array elements is not pulsed, whereby each array element is sensed independently.

In an exemplary embodiment of the AM-EWOD device, the shared component is shared between two array elements in adjacent rows.

In an exemplary embodiment of the AM-EWOD device, the shared component is shared between three array elements in three adjacent rows.

In an exemplary embodiment of the AM-EWOD device, the shared component is a shared sensor output column line.

In an exemplary embodiment of the AM-EWOD device, the impedance sensor circuitry of a first array element includes a first sensor readout transistor that passes an output current to the shared sensor output column line; the impedance sensor circuitry of a second array element includes a second sensor readout transistor that passes an output current to the shared sensor output column line; and the first and second sensor readout transistors pass a respective output current to the shared sensor output column line independently of each other.

In an exemplary embodiment of the AM-EWOD device, the first sensor readout transistor is an n-type transistor and the second sensor readout transistor is a p-type transistor.

In an exemplary embodiment of the AM-EWOD device, the shared component further includes a shared voltage supply line that is connected to the first and second sensor readout transistors.

In an exemplary embodiment of the AM-EWOD device, each array element further includes a reset transistor that applies a reset voltage to a gate of the respective sensor readout transistor of the array element.

In an exemplary embodiment of the AM-EWOD device, the impedance sensor circuitry of each array element further includes a sensor capacitor, and the gate of the respective sensor readout transistor of the array element is electrically connected to the sensor capacitor.

In an exemplary embodiment of the AM-EWOD device, the impedance sensor circuitry of each array element further includes a storage capacitor connected to the sensor capacitor oppositely from the sensor readout transistor; and a voltage pulse applied to the storage capacitor of a respective array element is coupled through the sensor capacitor to the sensor readout transistor.

In an exemplary embodiment of the AM-EWOD device, the more than one array elements are in adjacent columns.

In an exemplary embodiment of the AM-EWOD device, the shared component includes one or more shared voltage supply lines.

In an exemplary embodiment of the AM-EWOD device, the actuation circuit of each array element couples an input AC actuation voltage to the element electrode.

Another aspect of the invention is method of operating an AM-EWOD of any of the embodiments in which the impedance sensor circuitry includes a component that is shared between more than one of the array elements. In exemplary embodiments the method includes applying actuation voltages to the element and reference electrodes of the first and/or the second array elements with the actuation circuitry to actuate the first and/or second array elements; resetting a potential at the shared component of the impedance sensor circuitry by applying a reset potential to said shared component; performing a sensing operation on the first array element by pulsing an address line to the impedance sensor circuitry of the first array element, and reading an output current from the shared component to sense an impedance at the array element electrode of the first array element to determine a droplet property at the first array element; and performing a sensing operation on the second array element by pulsing an address line to the impedance sensor circuitry of the second array element, and reading an output current from the shared component to sense an impedance at the array element electrode of the second array element to determine a droplet property at the second array element; wherein the address lines of the first array element and the second array element are pulsed at different times. The method may include one or more of the following features, either individually or in combination.

In an exemplary embodiment of the method of operating an AM-EWOD device, the shared component comprises a shared sensor readout transistor that passes the output current to a sensor output line, and the reset potential is below a threshold voltage of the shared sensor readout transistor.

In an exemplary embodiment of the method of operating an AM-EWOD device, the impedance sensor circuitry of each of the first and second array elements further comprises: a sensor capacitor, and a gate of the shared sensor readout transistor is electrically connected to the sensor capacitor of the first array element and the sensor capacitor of the second array element; and a storage capacitor connected to the sensor capacitor oppositely from the shared sensor readout transistor; wherein during the sensing operation the pulse is applied to the storage capacitor of a respective array element and is coupled through the respective sensor capacitor to the shared sensor readout transistor.

In an exemplary embodiment of the method of operating an AM-EWOD device, the method further includes isolating the actuation circuitry from the impedance sensor circuitry during a sensing operation of a respective array element.

In an exemplary embodiment of the method of operating an AM-EWOD device, the method includes applying actuation voltages to the element and reference electrodes of the first and/or the second array elements with the actuation circuitry to actuate the first and/or second array elements; resetting a potential at the impedance sensor circuitry of the first array element and the second array element by applying a reset potential to said impedance sensor circuitry of the first array element and the second array element; performing a sensing operation on the first array element by pulsing a shared address line to the impedance sensor circuitry of the first array element and the second array element, and reading an output current from the shared sensor output column line to sense an impedance at the array element electrode of the first array element to determine a droplet property at the first array element; and performing a sensing operation on the second array element by pulsing the shared address line, and reading an output current from the shared sensor output column line to sense an impedance at the array element electrode of the second array element to determine a droplet property at the second array element; wherein while performing the sensing operation on the first array element, there is no output current from the second array element, and while performing the sensing operation on the second array element, there is no output current from the first array element.

In an exemplary embodiment of the method of operating an AM-EWOD device, the impedance sensor circuitry of the first array element includes an n-type sensor readout transistor that passes an output current to the shared sensor output column line; the impedance sensor circuitry of the second array element includes a p-type sensor readout transistor that passes am output current to the shared sensor output column line; and the pulse applied to the shared address line is a positive pulse during the sensing operation on the first array element, and the pulse applied to the shared address line is a negative pulse during the sensing operation on the first array element.

In an exemplary embodiment of the method of operating an AM-EWOD device, the impedance sensor circuitry of each of the first and second array elements further comprises: a sensor capacitor, and a gate of the sensor readout transistor is electrically connected to the sensor capacitor; and a storage capacitor connected to the sensor capacitor oppositely from the sensor readout transistor; and during the first and second sensing operations the pulse is applied to the storage capacitors of the first and second array elements, and is coupled through the respective sensor capacitor to the respective sensor readout transistor.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide an enhance AM-EWOD device. The AM-EWOD device could form a part of a lab-on-a-chip system. Such devices could be used in manipulating, reacting and sensor chemical, biochemical or physiological materials. Applications include healthcare diagnostic testing, material testing, chemical or biochemical material synthesis, proteomics, tools for research in life sciences and forensic science.

REFERENCE SIGNS LIST

32—reader
34—cartridge

35—external sensor module
36—EWOD device
38—control electronics
40—storage device
44—lower substrate
46—thin film electronics
48—array element electrodes
48A—array element electrode
48B—array element electrode
50—two-dimensional array
51—array element
52—liquid droplet
54—top substrate
56—spacer
58—reference electrode
60—non-polar fluid
62—insulator layer
64—first hydrophobic coating
66—contact angle
68—second hydrophobic coating
70A—electrical load with droplet present
70B—electrical load without droplet present
72—array element circuit
74—row driver circuits
76—column driver circuits
78—sensor row addressing
80—column detection circuits
82—serial interface
84—voltage supply interface
86—connecting wires
100—first array element
102—second array element
104—third array element
106—first array element
108—second array element
110—first array element
112—second array element
114—first array element
116—second array element
T1—switch transistor
T2—reset transistor
T3—sensor readout transistor
T4-T5 additional switch transistors
C1—storage capacitor
C2—sensor capacitor
C3—additional capacitor
Cl—device capacitance
I1—first inverter
I2—second inverter
S1—first analogue switch
S2—second analogue switch
TP—Reference electrode
GL, SL, SEL, RWS RST COL, ACT—circuit addressing or output lines
VPIX, VCCA—voltage supplies

What is claimed is:

1. An active matrix electro-wetting on dielectric (AM-EWOD) device comprising:

a plurality of array elements arranged in an array of rows and columns, each of the array elements including array element circuitry, an element electrode, and a reference electrode;

wherein the array element circuitry comprises:

actuation circuitry configured to apply actuation voltages to the element and reference electrodes for actuating the array element; and impedance sensor circuitry configured to sense impedance at the array element electrode to determine a droplet property at the array element, wherein at least one component of the impedance sensor circuitry is a shared component that is shared between more than one of the array elements;

wherein the shared component comprises a shared sensor readout transistor that is connected between a voltage supply line and a sensor output line, and the shared sensor readout transistor passes a sensor current for an array element being sensed to the sensor output line.

2. The AM-EWOD device of claim 1, wherein the shared component further comprises a shared reset transistor that applies a reset voltage to a gate of the shared sensor readout transistor.

3. The AM-EWOD device of claim 1, wherein the impedance sensor circuitry of each array element includes a sensor capacitor, and a gate of the shared sensor readout transistor is electrically connected to the sensor capacitor of each of the more than one of the array elements.

4. The AM-EWOD device of claim 3, wherein:

the impedance sensor circuitry of each array element further includes a storage capacitor connected to the sensor capacitor oppositely from the shared sensor readout transistor; and a voltage pulse applied to the storage capacitor of a respective array element is coupled through the sensor capacitor to the shared sensor readout transistor while a voltage applied to storage capacitors of others of the more than one array elements is not pulsed, whereby each array element is sensed independently.

5. The AM-EWOD device of claim 1, wherein the shared component is shared between two array elements in adjacent rows.

6. The AM-EWOD device of claim 1, wherein the shared component is shared between three array elements in three adjacent rows.

7. The AM-EWOD device of claim 1, wherein the shared component includes one or more shared voltage supply lines.

8. The AM-EWOD device of claim 1, wherein the actuation circuit of each array element couples an input AC actuation voltage to the element electrode.

9. An active matrix electro-wetting on dielectric (AM-EWOD) device comprising:

a plurality of array elements arranged in an array of rows and columns, each of the array elements including array element circuitry, an element electrode, and a reference electrode;

wherein the array element circuitry comprises:

actuation circuitry configured to apply actuation voltages to the element and reference electrodes for actuating the array element; and impedance sensor circuitry configured to sense impedance at the array element electrode to determine a droplet property at the array element, wherein at least one component of the impedance sensor circuitry is a shared component that is shared between more than one of the array elements;

wherein:

the shared component is a shared sensor output column line;

the impedance sensor circuitry of a first array element includes a first sensor readout transistor that passes an output current to the shared sensor output column line;

the impedance sensor circuitry of a second array element includes a second sensor readout transistor that passes an output current to the shared sensor output column line;

the first and second sensor readout transistors pass a respective output current to the shared sensor output column line independently of each other; and the first sensor readout transistor is an n-type transistor and the second sensor readout transistor is a p-type transistor.

10. The AM-EWOD device of claim 9, wherein the shared component further includes a shared voltage supply line that is connected to the first and second sensor readout transistors.

11. The AM-EWOD device of claim 9, wherein each array element further includes a reset transistor that applies a reset voltage to a gate of the respective sensor readout transistor of the array element.

12. The AM-EWOD device of claim 9, wherein the impedance sensor circuitry of each array element further includes a sensor capacitor, and the gate of the respective sensor readout transistor of the array element is electrically connected to the sensor capacitor.

13. The AM-EWOD device of claim 12, wherein:

the impedance sensor circuitry of each array element further includes a storage capacitor connected to the sensor capacitor oppositely from the sensor readout transistor; and a voltage pulse applied to the storage capacitor of a respective array element is coupled through the sensor capacitor to the sensor readout transistor.

14. The AM-EWOD device claim 9, wherein the more than one array elements are in adjacent columns.

15. A method of operating an active matrix electro-wetting on dielectric (AM-EWOD) device comprising the steps of:

arranging a plurality of array elements in an array of rows and columns, each of the array elements including array element circuitry, an element electrode, and a reference electrode, wherein the array element circuitry comprises: actuation circuitry configured to apply actuation voltages to the element and reference electrodes for actuating the array element; and impedance sensor circuitry configured to sense impedance at the array element electrode to determine a droplet property at the array element, wherein at least one component of the impedance sensor circuitry is a shared component that is shared between a first array element and a second array element;

applying actuation voltages to the element and reference electrodes of the first and/or the second array elements with the actuation circuitry to actuate the first and/or second array elements;

resetting a potential at the shared component of the impedance sensor circuitry by applying a reset potential to said shared component;

performing a sensing operation on the first array element by pulsing an address line to the impedance sensor circuitry of the first array element, and reading an output current from the shared component to sense an impedance at the array element electrode of the first array element to determine a droplet property at the first array element; and performing a sensing operation on the second array element by pulsing an address line to the impedance sensor circuitry of the second array element, and reading an output current from the shared component to sense an impedance at the array element electrode of the second array element to determine a droplet property at the second array element;

wherein the address lines of the first array element and the second array element are pulsed at different times.

16. The method of operating an AM-EWOD device of claim 15, wherein the shared component comprises a shared sensor readout transistor that passes the output current to a sensor output line, and the reset potential is below a threshold voltage of the shared sensor readout transistor.

17. The method of operating an AM-EWOD device of claim 16, wherein the impedance sensor circuitry of each of the first and second array elements further comprises:

a sensor capacitor, and a gate of the shared sensor readout transistor is electrically connected to the sensor capacitor of the first array element and the sensor capacitor of the second array element; and a storage capacitor connected to the sensor capacitor oppositely from the shared sensor readout transistor;

wherein during the sensing operation the pulse is applied to the storage capacitor of a respective array element and is coupled through the respective sensor capacitor to the shared sensor readout transistor.

18. The method of operating an AM-EWOD device of claim 15, further comprising isolating the actuation circuitry from the impedance sensor circuitry during a sensing operation of a respective array element.

19. A method of operating an active matrix electro-wetting on dielectric (AM-EWOD) device comprising the steps of:

arranging a plurality of array elements in an array of rows and columns, each of the array elements including array element circuitry, an element electrode, and a reference electrode;

wherein the array element circuitry comprises: actuation circuitry configured to apply actuation voltages to the element and reference electrodes for actuating the array element; and impedance sensor circuitry configured to sense impedance at the array element electrode to determine a droplet property at the array element, wherein the impedance sensor circuitry of the first array element and the second array element share a sensor output column line;

applying actuation voltages to the element and reference electrodes of the first and/or the second array elements with the actuation circuitry to actuate the first and/or second array elements;

resetting a potential at the impedance sensor circuitry of the first array element and the second array element by applying a reset potential to said impedance sensor circuitry of the first array element and the second array element;

performing a sensing operation on the first array element by pulsing a shared address line to the impedance sensor circuitry of the first array element and the second array element, and reading an output current from the shared sensor output column line to sense an impedance at the array element electrode of the first array element to determine a droplet property at the first array element; and performing a sensing operation on the second array element by pulsing the shared address line, and reading an output current from the shared sensor output column line to sense an impedance at the array element electrode of the second array element to determine a droplet property at the second array element;

wherein while performing the sensing operation on the first array element, there is no output current from the second array element, and while performing the sensing operation on the second array element, there is no output current from the first array element.

20. The method of operating an AM-EWOD device of claim 19, wherein:

the impedance sensor circuitry of the first array element includes an n-type sensor readout transistor that passes an output current to the shared sensor output column line;

the impedance sensor circuitry of the second array element includes a p-type sensor readout transistor that passes am output current to the shared sensor output column line; and the pulse applied to the shared address line is a positive pulse during the sensing operation on the first array element, and the pulse applied to the shared address line is a negative pulse during the sensing operation on the first array element.

21. The method of operating an AM-EWOD device of claim 20, wherein:

the impedance sensor circuitry of each of the first and second array elements further comprises: a sensor capacitor, and a gate of the sensor readout transistor is electrically connected to the sensor capacitor; and a storage capacitor connected to the sensor capacitor oppositely from the sensor readout transistor; and during the first and second sensing operations the pulse is applied to the storage capacitors of the first and second array elements, and is coupled through the respective sensor capacitor to the respective sensor readout transistor.

22. The method of operating an AM-EWOD device of claim 19, further comprising isolating the actuation circuitry from the impedance sensor circuitry during a sensor operation of a respective array element.

* * * * *